United States Patent
Harris, Sr. et al.

(10) Patent No.: US 10,650,380 B1
(45) Date of Patent: May 12, 2020

(54) SYSTEM AND METHOD FOR EVALUATING REQUESTS

(71) Applicant: McKesson Corporation, Irving, TX (US)

(72) Inventors: Patrick I. Harris, Sr., Brookhaven, GA (US); Jessica Russell, Woodstock, GA (US); Tracy Highton, Lawrenceville, GA (US)

(73) Assignee: McKesson Corporation, San Francisco, CA (US)

( * ) Notice: Subject to any disclaimer, the term of this patent is extended or adjusted under 35 U.S.C. 154(b) by 219 days.

(21) Appl. No.: 15/475,672

(22) Filed: Mar. 31, 2017

(51) Int. Cl.
G06Q 30/06 (2012.01)
G06Q 20/40 (2012.01)
G06Q 40/00 (2012.01)

(52) U.S. Cl.
CPC ......... *G06Q 20/4016* (2013.01); *G06Q 40/12* (2013.12)

(58) Field of Classification Search
CPC .................................................... G06Q 30/06
USPC .......................................................... 705/30
See application file for complete search history.

(56) References Cited

U.S. PATENT DOCUMENTS

| | | |
|---|---|---|
| 5,235,702 A | 8/1993 | Miller |
| 5,244,556 A | 9/1993 | Inoue |
| 5,359,509 A | 10/1994 | Little et al. |
| 5,544,044 A | 8/1996 | Leatherman |
| 5,550,734 A | 8/1996 | Tarter et al. |
| 5,578,003 A | 11/1996 | Borger |
| 5,628,530 A | 5/1997 | Thornton |
| 5,644,378 A | 7/1997 | Burks et al. |
| 5,704,044 A | 12/1997 | Tarter et al. |
| 5,832,447 A | 11/1998 | Rieker et al. |
| 5,950,169 A | 9/1999 | Borghesi et al. |

(Continued)

FOREIGN PATENT DOCUMENTS

| | | |
|---|---|---|
| CA | 2482370 | 3/2006 |
| WO | WO 1995/003569 | 2/1995 |

(Continued)

OTHER PUBLICATIONS

"NCPDP Recommendations for Improving Prescription Drug Monitoring Programs", National Council for Prescription Drugs Program, White Paper, dated May 2015, pp. 1-28.

(Continued)

*Primary Examiner* — Russell S Glass
(74) *Attorney, Agent, or Firm* — Alston & Bird LLP

(57) ABSTRACT

The evaluation system provides a real-time mechanism for auditing purchase request transactions prior to the purchase being completed in order to determine if one or more audit parameters are violated and the transaction should not be completed. An electronic product request can be received from a merchant of the product. The request can identify at least the merchant, the party, and the product requested for purchase. One or more business rules and auditing parameters for auditing the request can be identified based on the identity of the merchant. The contents of the request can then be audited to determine if the request satisfies the audit parameters. The contents of the request can also be used to identify historical transactions for the party, which can be used to determine if the current request violates one or more of the audit parameters.

20 Claims, 8 Drawing Sheets

(56) References Cited

U.S. PATENT DOCUMENTS

| | | |
|---|---|---|
| 6,006,242 A | 12/1999 | Poole et al. |
| 6,012,035 A | 1/2000 | Freeman, Jr. et al. |
| 6,073,104 A | 6/2000 | Field |
| 6,081,786 A | 6/2000 | Barry et al. |
| 6,202,921 B1 | 3/2001 | Boyer et al. |
| 6,208,973 B1 | 3/2001 | Boyer et al. |
| 6,324,516 B1 | 11/2001 | Shults et al. |
| 6,330,546 B1 | 12/2001 | Gopinathan et al. |
| 6,341,265 B1 | 1/2002 | Provost et al. |
| 6,343,271 B1 | 1/2002 | Peterson et al. |
| 6,578,003 B1 | 6/2003 | Camarda et al. |
| 6,632,251 B1 | 10/2003 | Ruffen et al. |
| 6,650,964 B2 | 11/2003 | Spano et al. |
| 6,671,692 B1 | 12/2003 | Marpe et al. |
| 6,671,693 B1 | 12/2003 | Marpe et al. |
| 6,714,918 B2 | 3/2004 | Hillmer et al. |
| 6,757,898 B1 | 6/2004 | Ilsen et al. |
| 6,769,228 B1 | 8/2004 | Mahar |
| 7,155,397 B2 | 12/2006 | Alexander et al. |
| 7,720,697 B1 | 5/2010 | Silverstein |
| 8,036,913 B1 | 10/2011 | Pinsonneault |
| 8,046,242 B1 | 10/2011 | daCosta |
| 1,028,888 A1 | 11/2011 | Whiddon et al. |
| 8,060,379 B1 | 11/2011 | Pinsonneault et al. |
| 8,099,339 B1 | 1/2012 | Pinsonneault |
| 8,244,556 B1 | 8/2012 | Ringold |
| 8,335,672 B1 | 12/2012 | Ringold |
| 8,386,274 B1 | 2/2013 | Pinsonneault |
| 8,386,276 B1 | 2/2013 | Liu et al. |
| 8,392,209 B1 | 3/2013 | Bertha et al. |
| 8,392,219 B1 | 3/2013 | Pinsonneault et al. |
| 8,688,468 B1 | 4/2014 | daCosta et al. |
| 8,725,532 B1 | 5/2014 | Ringold |
| 8,768,724 B2 | 7/2014 | Whiddon et al. |
| 9,122,783 B2 | 9/2015 | Carson et al. |
| 9,443,370 B2 | 9/2016 | Carson et al. |
| 2001/0041993 A1 | 11/2001 | Campbell |
| 2002/0002495 A1 | 1/2002 | Ullman |
| 2002/0029157 A1 | 3/2002 | Marchosky |
| 2002/0035488 A1 | 3/2002 | Aquila et al. |
| 2003/0050803 A1 | 3/2002 | Marchosky |
| 2002/0046169 A1 | 4/2002 | Keresman et al. |
| 2002/0049617 A1 | 4/2002 | Lencki et al. |
| 2002/0055856 A1 | 5/2002 | Adams |
| 2002/0065687 A1 | 5/2002 | Onoue |
| 2002/0087583 A1 | 7/2002 | Morgan et al. |
| 2002/0111832 A1 | 8/2002 | Judge |
| 2002/0120559 A1 | 8/2002 | O'Mara et al. |
| 2002/0133503 A1 | 9/2002 | Amar et al. |
| 2002/0138155 A1 | 9/2002 | Bristol |
| 2002/0143434 A1 | 10/2002 | Greeven et al. |
| 2002/0198831 A1 | 12/2002 | Patricelli et al. |
| 2003/0009367 A1 | 1/2003 | Morrison |
| 2003/0050799 A1 | 3/2003 | Jay et al. |
| 2003/0069020 A1 | 4/2003 | Hillmer et al. |
| 2003/0074225 A1 | 4/2003 | Borsand et al. |
| 2003/0083903 A1 | 5/2003 | Myers |
| 2003/0120588 A1 | 6/2003 | Dodd et al. |
| 2003/0130868 A1 | 7/2003 | Coelho |
| 2003/0149625 A1 | 8/2003 | Leonardi et al. |
| 2003/0154163 A1 | 8/2003 | Phillips et al. |
| 2003/0158755 A1 | 8/2003 | Neuman |
| 2003/0229519 A1 | 12/2003 | Eidex et al. |
| 2003/0229540 A1 | 12/2003 | Algiene |
| 2004/0006490 A1 | 1/2004 | Gingrich et al. |
| 2004/0039599 A1 | 2/2004 | Fralic |
| 2004/0054685 A1 | 3/2004 | Rahn et al. |
| 2004/0064215 A1 | 4/2004 | Greeven et al. |
| 2004/0073457 A1 | 4/2004 | Kalies |
| 2004/0078234 A1 | 4/2004 | Tallal, Jr. |
| 2004/0078247 A1 | 4/2004 | Rowe et al. |
| 2004/0088187 A1 | 5/2004 | Chudy et al. |
| 2004/0093242 A1 | 5/2004 | Cadigan et al. |
| 2004/0117205 A1 | 6/2004 | Reardan et al. |
| 2004/0117323 A1 | 6/2004 | Mindala |
| 2004/0133452 A1 | 7/2004 | Denny et al. |
| 2004/0148198 A1 | 7/2004 | Kalies |
| 2004/0178112 A1 | 9/2004 | Snyder |
| 2004/0225528 A1 | 11/2004 | Brock |
| 2004/0249745 A1 | 12/2004 | Baaren |
| 2005/0015280 A1 | 1/2005 | Gabel et al. |
| 2005/0060201 A1 | 3/2005 | Connely, III et al. |
| 2005/0065821 A1 | 3/2005 | Kalies |
| 2005/0090425 A1 | 4/2005 | Reardan et al. |
| 2005/0102169 A1 | 5/2005 | Wilson |
| 2005/0137912 A1 | 6/2005 | Rao et al. |
| 2005/0154627 A1 | 7/2005 | Zuzek |
| 2005/0187791 A1 | 8/2005 | DiMaggio et al. |
| 2005/0187793 A1 | 8/2005 | Myles |
| 2005/0197862 A1 | 9/2005 | Paterson et al. |
| 2005/0209879 A1 | 9/2005 | Chalmers |
| 2005/0240473 A1 | 10/2005 | Ayers, Jr. et al. |
| 2006/0020514 A1 | 1/2006 | Yered |
| 2006/0026041 A1 | 2/2006 | Ullman |
| 2006/0062734 A1 | 3/2006 | Melker et al. |
| 2006/0074717 A1 | 4/2006 | Feldman et al. |
| 2006/0106648 A1 | 5/2006 | Esham et al. |
| 2006/0129434 A1 | 6/2006 | Smitherman et al. |
| 2006/0149784 A1 | 7/2006 | Tholl et al. |
| 2006/0184391 A1 | 8/2006 | Barre et al. |
| 2006/0217824 A1 | 9/2006 | Allmon |
| 2006/0259363 A1 | 11/2006 | Jhetam et al. |
| 2006/0266826 A1 | 11/2006 | Banfield et al. |
| 2007/0005402 A1 | 1/2007 | Kennedy et al. |
| 2007/0050209 A1 | 3/2007 | Yered |
| 2007/0050219 A1 | 3/2007 | Sohr |
| 2007/0136100 A1 | 6/2007 | Daugherty et al. |
| 2007/0162303 A1 | 7/2007 | Wiley et al. |
| 2007/0214009 A1 | 9/2007 | Epstein et al. |
| 2007/0233525 A1 | 10/2007 | Boyle |
| 2007/0233526 A1 | 10/2007 | Hoffman et al. |
| 2007/0239493 A1 | 10/2007 | Sweetland et al. |
| 2007/0260491 A1 | 11/2007 | Palmer et al. |
| 2007/0276697 A1 | 11/2007 | Wiley, II et al. |
| 2008/0015893 A1 | 1/2008 | Miller et al. |
| 2008/0015894 A1 | 1/2008 | Miller et al. |
| 2008/0097784 A1 | 4/2008 | Miller et al. |
| 2008/0112615 A1 | 5/2008 | Obrea |
| 2001/0047281 A1 | 11/2008 | Keresman |
| 2008/0288281 A1 | 11/2008 | Shell et al. |
| 2008/0312954 A1 | 12/2008 | Ulrich et al. |
| 2009/0048863 A1 | 2/2009 | Kozlowski et al. |
| 2009/0144087 A1 | 6/2009 | Kelsch et al. |
| 2009/0164376 A1 | 6/2009 | Guthrie |
| 2009/0281824 A1 | 11/2009 | Hardaway |
| 2005/0288972 A1 | 12/2009 | Marvin et al. |
| 2009/0327363 A1 | 12/2009 | Cullen et al. |
| 2010/0082367 A1 | 4/2010 | Hains et al. |
| 2010/0305975 A1 | 12/2010 | Daya et al. |
| 2010/0312576 A1 | 12/2010 | Brown et al. |
| 2010/0324936 A1 | 12/2010 | Vishnubhatla et al. |
| 2011/0106556 A1 | 5/2011 | Patel et al. |
| 2011/0145018 A1 | 6/2011 | Fotsch et al. |
| 2011/0161109 A1 | 6/2011 | Pinsonneault et al. |
| 2011/0173020 A1 | 7/2011 | Bailey et al. |
| 2011/0282690 A1 | 11/2011 | Patel et al. |
| 2012/0046970 A1 | 2/2012 | Potts et al. |
| 2012/0173263 A1 | 7/2012 | Nease et al. |
| 2012/0310661 A1 | 12/2012 | Greene |
| 2013/0151373 A1 | 6/2013 | Flanagan et al. |
| 2013/0253700 A1 | 9/2013 | Carson et al. |
| 2014/0025545 A1 | 1/2014 | Carson et al. |
| 2014/0156298 A1 | 6/2014 | Crawford et al. |
| 2014/0188498 A1 | 7/2014 | Petrimoulx et al. |

(56) References Cited

U.S. PATENT DOCUMENTS

2017/0287061 A1* 10/2017 Chae .................. G06Q 20/3272
2018/0012244 A1*  1/2018 Leonardi ............ G06Q 30/0207

FOREIGN PATENT DOCUMENTS

| WO | WO 2000/039737 | 7/2000  |
|----|----------------|---------|
| WO | WO 0173652     | 10/2001 |
| WO | WO 2007/025295 | 3/2007  |

OTHER PUBLICATIONS

"Prescription Drug Monitoring Frequently Asked Questions (FAQ)" [online], retrieved from the Internet: <http://www.pdmpassist.org/content/prescription-drug-monitoring-frequently-asked-questions-faq>.

"State Prescription Drug Monitoring Programs" [online], retrieved from the Internet: <https://www.deadiversion.usdoj.gov/faq/rx_monitor.htm> [retrieved Jun. 2016].

"The Alliance of Slates with Prescription Monitoring Programs" [online], retrieved from the Internet: <http://dhhs.ne.gov/DOP%20document%20library/Alliannce%20of%20States%20with%20Presscription%20Monitoring%20Programs.pdf> (2012).

Anonymous ACS to Demonstrate Electronic Health Record Solution Suite at MMIS 2007 Conference; EHR Tools Consolidate Data, Provide Useful Information at the Point of Care for Medicaid Providers, Payers, and Patients, PR Newswire, Aug. 13, 2007, New York, NY, USA.

Anonymous, Medic; On-line Goes In-House, Chain Store Age Executive, Jan. 1987, vol. 63, Issue 1, USA; Abstract only.

Anonymous, Pharmacy Industry Leaders Launch Firm to Supply Real-Time Data. PR Newswire. Jul. 30, 2001, p. 1 New York, NY, USA.

Anonymous, TechRx Announces Successful Beta Deployment of T-Rex, PR Newswire, May 13, 2002.

Final Office Action for U.S. Appl. No. 10/439,423 dated Dec. 24, 2009.

Final Office Action for U.S. Appl. No. 10/439,423 dated Dec. 9, 2008.

Final Office Action for U.S. Appl. No. 11/961,559 dated Nov. 10, 2010.

Final Office Action for U.S. Appl. No. 12/411,043 dated Jul. 7, 2011.

Final Office Action for U.S. Appl. No. 12/411,075 dated Oct. 26, 2011.

Final Office Action for U.S. Appl. No. 12/480,907 dated Apr. 2, 2013.

Final Office Action for U.S. Appl. No. 12/480,907 dated May 4, 2012.

Final Office Action for U.S. Appl. No. 12/730,897 dated Nov. 22, 2013.

Final Office Action for U.S. Appl. No. 12/820,750 dated Jul. 6, 2012.

Final Office Action for U.S. Appl. No. 13/566,693 dated Dec. 23, 2015.

Final Office Action for U.S. Appl. No. 13/566,693 dated Nov. 6, 1014.

Final Office Action for U.S. Appl. No. 13/628,623 dated Jun. 14, 2016.

Final Office Action for U.S. Appl. No. 13/628,623 dated Mar. 11, 2015.

Final Office Action for U.S. Appl. No. 13/735,212 dated Jun. 12, 2015.

Final Office Action for U.S. Appl. No. 13/763,618 dated Apr. 28, 2017.

Final Office Action for U.S. Appl. No. 13/763,618 dated Mar. 28, 2016.

Final Office Action for U.S. Appl. No. 13/927,862 dated Sep. 22, 2016, 17 pages.

Final Office Action for U.S. Appl. No. 14/062,593 dated Nov. 4, 2016, 21 pages.

Final Office Action for U.S. Appl. No. 14/209,248 dated Nov. 4, 2016, 35 pages.

GAO publication GA0-01-662 "Medicaid: State Efforts to Control Improper Payments Vary" Jun. 2001.

Glaser, M. Computer Eliminates Third-Party Administrator. Drug Topics. Oradell: May 3, 1993. vol. 137, Issu.9; p. 54, 3 pgs. [Retr. From Internet Apr. 11, 2007]. URL: <http://proquest.umi.com/pqdweb?did=779533&sid=5&Fmt=11&clientId=19649&RQT=309&VNam=PQD>.

Gregory J. Borca, "Technology Curtails Health Care Fraud"Managed Care Magazine, Apr. 2001.

HealthWatch Technology—HWT Inc. Website obtained from Mar. 25, 2002 web.archive.org.

International Search Report for PCT/US2003/015982 dated Jun. 2, 2004.

International Search Report for PCT/US2003/015992 dated Jun. 2, 2004.

Lamb, J., New Era of Electronic Medicine Management: E-Prescriptions, Britain's Traditionally Cautious National-Health Service is Starting Trials for Online Prescription, with the Aim of Cutting Costs. Financial Times, London, Feb. 21, 2001, p. 6, London, United Kingdom.

Letter Restarting Period for Response for U.S. Appl. No. 13/566,693 dated Jul. 9, 2014.

McKesson & American Pharmacy Alliance Agree to Offer Omnlink Connectivity to Retail Pharmacies: More than 11,000 Pharmacies Gain Ability to Access Centralized Pharmacy Application. Bus. Wire. New York: Jul. 28, 1998 did=323992868&sid=4&Fmt=3&clientId=19649&RQT&VNam=PQD>.

NDC Code Direcotry Tool—https://web.archive.org/web/20090327121011/http://www.accessdata.fda.gov/scripts/cder/ndc/default.cfm dated Mar. 29, 2009.

NDC Code Directory Description—https://web_archive.org/web/20090603081835/http://www.fda.gov/Drugs/InformationOnDrugs/ucm142438.htm Jun. 3, 2009.

NDC Health Information Services Announces Contract with Arrow Pharmacy and Nutrition Centers for Pre & Post Editing Service. PR Newswire. New York: Mar. 11, 1999. p. 1. [Retr. Internet Oct. 30, 2007] URL: <http://proquest.umi.com/pqdweb?did=39644468&sid=4&Fmt=3&clientId=19649&RQT=309&VNam=PQD>.

NDC Health Provides United Drugs With Intelligent Valued-Added Network Services and New Information Solutions. PR Newswire. New York: Dec. 12, 2000. p. 1. [Retr. Internet Apr. 11, 2007] URL: <http://proquest.umi.com/pqdweb?did=65133864&sid=4&Fmt=3&clientId=19649&RQT=309&VNam=PQD>.

Non-final Office Action for U.S. Appl. No. 10/439,423 dated Apr. 28, 2009.

Non-final Office Action for U.S. Appl. No. 10/439,423 dated Jul. 31, 2008.

Non-final Office Action for U.S. Appl. No. 11/961,559 dated Mar. 3, 2010.

Non-final Office Action for U.S. Appl. No. 12/411,043 dated Feb. 8, 2011.

Non-final Office Action for U.S. Appl. No. 12/411,075 dated Jul. 7, 2011.

Non-Final Office Action for U.S. Appl. No. 12/411,075 dated May 22, 2013.

Non-Final Office Action for U.S. Appl. No. 12/480,907 dated Sep. 20, 2011.

Non-Final Office Action for U.S. Appl. No. 12/730,897 dated Nov. 8, 2012.

Non-Final Office Action for U.S. Appl. No. 12/730,897 dated Sep. 29, 2011.

Non-Final Office Action for U.S. Appl. No. 12/820,750 dated Feb. 1, 2012.

Non-Final Office Action for U.S. Appl. No. 12/480,907 dated Sep. 12, 2012.

Non-Final Office Action for U.S. Appl. No. 13/566,693 dated Apr. 30, 2014.

Non-final Office Action for U.S. Appl. No. 13/566,693 dated Jul. 23, 2015.

(56) References Cited

OTHER PUBLICATIONS

Non-final Office Action for U.S. Appl. No. 13/628,623 dated Dec. 18, 2015.
Non-Final Office Action for U.S. Appl. No. 13/628,623 dated Sep. 25, 2014.
Non-final Office Action for U.S. Appl. No. 13/735,212 dated Jan. 14, 2015.
Non-final Office Action for U.S. Appl. No. 13/763,618 dated Sep. 22, 2015.
Non-Final Office Action for U.S. Appl. No. 13/763,618 dated Sep. 23, 2016, 21 pages.
Non-final Office Action for U.S. Appl. No. 13/927,862 dated Jul. 6, 2015.
Non-Final Office Action for U.S. Appl. No. 14/062,593 dated Jun. 3, 2016.
Non-final Office Action for U.S. Appl. No. 14/062,593 dated Sep. 2, 2015.
Non-Final Office Action for U.S. Appl. No. 14/209,248 dated Apr. 22, 2016.
Non-Final Office Action for U.S. Appl. No. 13/763,618 dated Jan. 15, 2015.
Notice of Allowance for U.S. Appl. No. 13/538,377 dated Dec. 27, 2013.
Notice of Allowance received for U.S. Appl. No. 14/209,248 dated Jun. 2, 2019.
NPPES Registry Lookup Tool—https://web.archive.org/web/20130213231441/https://npiregistry.cms.hhs.gov/NPPESRegistry/NIPRegistryHome.do dated Feb. 13, 2013.
Office Action for Canadian Application No. 2,485,031 dated Apr. 5, 2012.
Office Action for Canadian Application No. 2,485,034 dated Nov. 22, 2011.
Office Action for U.S. Appl. No. 14/062,593 dated Jun. 3, 2016.
Office Action for U.S. Appl. No. 14/062,593 dated Jun. 6, 2019.
Office Action for U.S. Appl. No. 14/062,593 dated May 18, 2018.
Office Action for U.S. Appl. No. 14/062,593 dated Nov. 4, 2016.
Office Action for U.S. Appl. No. 14/062,593 dated Oct. 4, 2019.
Office Action for U.S. Appl. No. 14/062,593 dated Sep. 2, 2015.
Office Action for U.S. Appl. No. 14/062,593 dated Sep. 29, 2017.
Office Action for U.S. Appl. No. 14/209,248 dated Apr. 22, 2016.
Office Action for U.S. Appl. No. 14/209,248 dated Jan. 26, 2018.
Office Action for U.S. Appl. No. 14/209,248 dated Jul. 13, 2017.
Office Action for U.S. Appl. No. 14/209,248 dated May 5, 2018.
Office Action for U.S. Appl. No. 14/209,248 dated Nov. 4, 2016.
Office Action for U.S. Appl. No. 14/209,248 dated Oct. 5, 2018.
Office Action for U.S. Appl. No. 14/519,626 dated Jan. 29, 2018.
Office Action for U.S. Appl. No. 14/519,626 dated Jun. 3, 2019.
Office Action for U.S. Appl. No. 14/519,626 dated May 1, 2017.
Office Action for U.S. Appl. No. 14/519,626 dated Oct. 31, 2018.
Office Action for U.S. Appl. No. 15/475,672 dated Mar. 21, 2019, 6 pages.
Pharmacy Industry Leaders Launch Firm to Supply Real-Time Data. PR Newswire, New York: Jul. 30, 2001, p. 1. [Retr. Internet 10130/07] URL: <http://proquest.umi.com/pqdweb?did=77135077&sid=4&Fmt=11&clientId=19649&RQT=309&VNarTFPQD>.
Radcliffe, J.G.Y., The Insurance Industry's Use of Databases to Prevent and Detect Fraud, and Improve.
Recoveries, European Convention on Security and Detection, Conference Publication No. 408, May 16-18, 1995, pp. 216-224.
Sampson, R.J., Taking Control of Health Care Costs, Best's Review—Life Health Insurance Edition, Nov. 1983, vol. 84, Issue 7, USA; Abstract only.
Simeone, R et al. "An Evaluation of Prescription Drug Monitoring Programs" dated Sep. 1, 2006.
Stefano, Bordoni, Insurance Faud Evaluation A Fuzzy Expert System, 2001 IEEE International Fuzzy Systems Conference, pp, 1491-1494.
Sternberg et al., Using Cultural Algorithyms too Support Re-engineering of Rule-Based Expert systems in Dynamic Performance Environments: A Case Study in Fraud Detection, IEEE Transactions on Evolutionary Computation, vol. 1 No. 4, Nov. 1997, pp. 225-243.
Titus, Nancy Riaden. Health Insurance Industry Battles High Cost Fraud, Journal Record, Nov. 20, 1993, pg. no cite.
Wholesalers Get Into Technology Game. Chain Drug Review, Feb. 15, 1999. pRx20 [Retr. From Internet Oct. 30, 2007] URL:<http://www.accessmylibrary.com/coms/summary_0286-487914_ITM>.
"Informatics and Clinical Decision Support" [online] retrieved from the Wayback machine: <https://web.archive.org/web/20170302011019/http://www.medscape.org:80/viewarticle/571099> dated (Mar. 2, 2017).

\* cited by examiner

SYSTEM AND METHOD FOR EVALUATING REQUESTS

TECHNICAL FIELD

Aspects of the disclosure relate generally to auditing systems, and more particularly, to systems and methods for evaluating and auditing requests.

BACKGROUND

Certain federal, state, and/or local agencies require merchants of certain products and/or services to report sales of those products or services to purchases. One intent of the reporting requirement is to ensure the safety of the acquiring party by monitoring how much and how often the acquiring party may be acquiring particular products or services. Another intent of the reporting requirement is to identify and track potentially fraudulent activity, either by the merchant or the acquiring party.

Under the reporting requirement, merchants submit information about their sales to the proper reporting entity in a batch format. As such, sales of products are reported after the sales have been completed, the acquiring party has received the product or service, and the acquiring party is no longer at the merchant's business location. In addition, for sales of certain products, merchants are required to access a third-party website to evaluate the purchase history of the acquiring party in order to make a determination as to whether the sale of the product to the acquiring party is permitted.

The conventional process has several drawbacks. First, since the reporting is done in batch format after the completion of the transaction, transactions that should not have been permitted are only determined after the fact. The product or service has already been provided to the acquiring party, who is unlikely to return it. Similarly, detection of potential fraud can only be determined long after the sale of the product is completed, which allows the fraud to continue during the additional lag time between the actual purchase and the evaluation of the batch sales data.

In addition, requiring merchants to break workflow and access a third-party website to review an acquiring party's purchase history has challenges as well. First, the model assumes that the website is always available. If the website is down the merchant may not be able to complete the transaction or may choose to complete the transaction without consultation of the website. Additionally, the evaluation of the website by the merchant (and more specifically employees of the merchant) leads to inconsistent decision-making based on the data provided on the website as each individual is likely to evaluate and process the information in different ways, leading to inconsistent decisions as to whether the purchase should be completed.

BRIEF DESCRIPTION OF THE DRAWINGS

Reference will now be made to the accompanying drawings, which are not necessarily drawn to scale, and wherein.

DETAILED DESCRIPTION OF EXEMPLARY EMBODIMENTS

Example embodiments will now be described more fully hereinafter with reference to the accompanying drawings, in which example embodiments are shown. The concepts disclosed herein may, however, be embodied in many different forms and should not be construed as limited to the example embodiments set forth herein; rather, these embodiments are provided so that this disclosure will be thorough and complete, and will fully convey the scope of the concepts to those skilled in the art. Like numbers refer to like, but not necessarily the same or identical, elements throughout.

Example embodiments described herein include systems and methods for auditing purchase transactions based on a series of business rules that improve the efficiency and accuracy of the evaluation process. The evaluation system can receive and audit or otherwise evaluate purchase transactions in real-time as the purchase is being requested. This provides the opportunity to provide the merchant with alerts notifying the merchant of issues identified in the purchase transaction, or based on information in the purchase transaction prior to the transaction being completed and the acquiring party leaving the merchant store location with the product being requested. This allows for a more efficient process of preventing the transaction from being completed or at least warning the merchant and allowing the merchant to obtain additional information about the transaction and/or the acquiring party before the product exchange has been made.

System Overview

Figure 1:
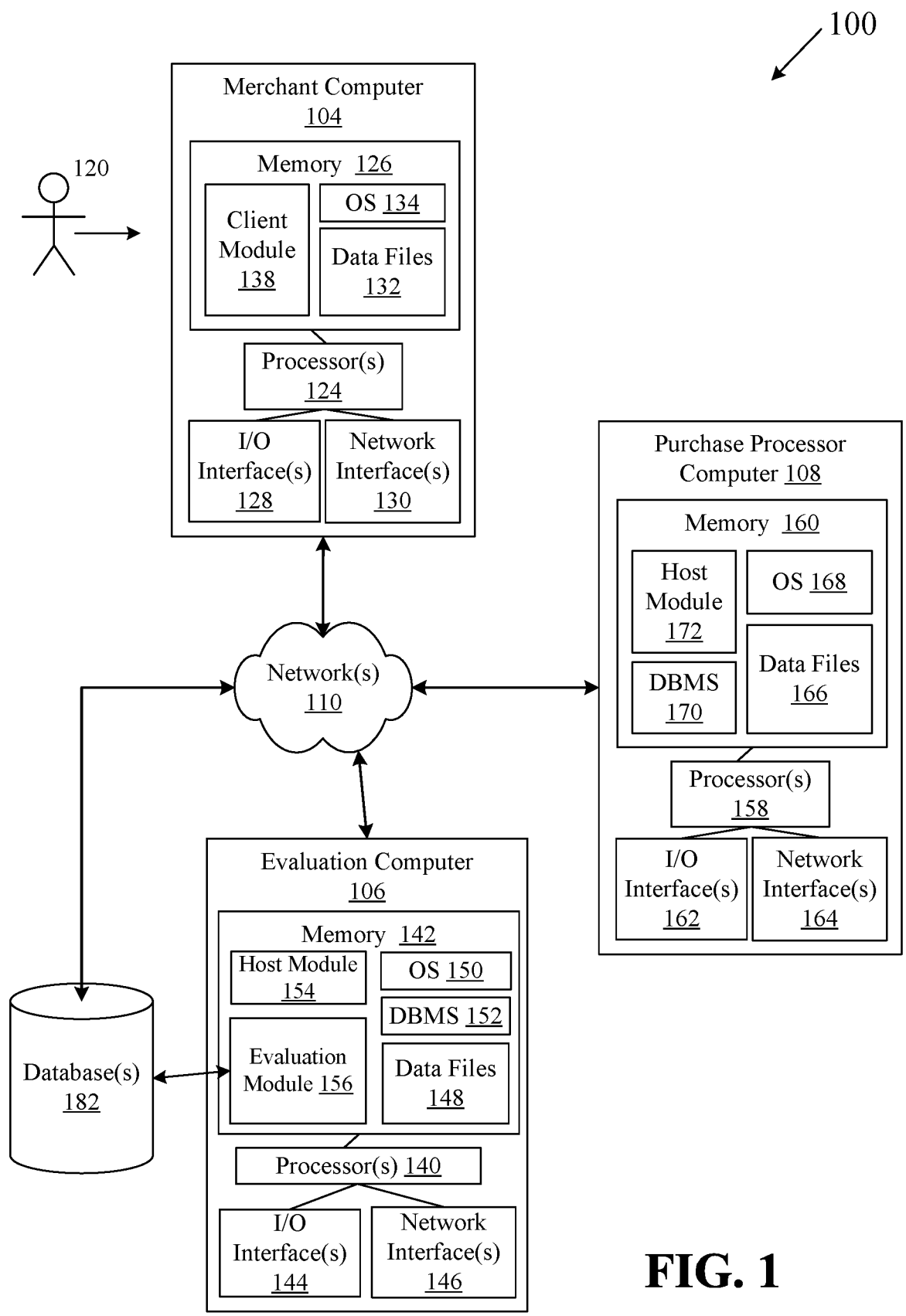
FIG. 1 illustrates an example overview of a system that facilitates auditing of purchase transactions according to one example embodiment of the disclosure.

FIG. 1 illustrates an example system 100 supporting methods for auditing electronic product requests in real-time or near real-time, according to one example embodiment. As shown in FIG. 1, the system 100 may include at least one merchant computer 104, at least one evaluation computer 106, and at least one purchase processor computer 108. As desired, each of the merchant computer 104, evaluation computer 106, and/or purchase processor computer 108 may include one or more processing devices that may be configured for accessing and reading associated computer-readable media having stored thereon data and/or computer-executable instructions for implementing the automated auditing of electronic product request transactions.

Additionally, in certain example embodiments, the evaluation computer 106 may be in communication with one or more data storage devices, such as a database 182. The database 182 may receive, store, and provide, as needed, business rules for determining how electronic product requests are to be audited, historical records of completed electronic product requests, auditing parameters and business rules provided for each merchant or group of merchants (e.g., a chain of stores affiliated with one another) to be used in auditing the electronic product requests, one or more rejection messages to be used when an electronic product request is flagged or rejected as part of the automated auditing process, other similar parameter information used for auditing process, as well as several other different forms of data, as desired, for the evaluation computer 106. In certain exemplary embodiments, the historical records of completed electronic product requests includes all or any portion of the data included in electronic product requests that are adjudicated as approved/paid by a purchase processor computer as discussed below. Alternatively, the data storage function may be included in the evaluation computer itself, such as in the memory 142.

Generally, the evaluation computer 106 is a special purpose machine (a switch/router) configured for receiving electronic product requests from merchant computers associated with (e.g., located within or otherwise under the control and administration of) a merchant of a product or service to an acquiring party, auditing the contents or data of one or more data fields of the electronic product request transaction, conducting edit actions (e.g., adding data, removing data, or modifying data) in one or more data fields of the electronic product request transaction as part of the audit process, and forwarding the electronic product requests to a purchase processor computer associated with (e.g., located within or otherwise under the control and administration of) a purchase processor or another merchant computer for an unrelated merchant that is not commonly owned with the originating merchant computer. Further the special purpose evaluation computer 106 can be configured to receive responses from the purchase processor computers and/or merchant computers, conduct additional auditing and editing on the electronic responses to the product requests, and forward the responses to the electronic product request to the originating merchant computer or to another third party. The special purpose evaluation computer 106 can include or otherwise be associated with suitable hardware and/or software for electronically transmitting and receiving data and/or computer-executable instructions over one or more communications links or networks. The special purpose evaluation computer 106 may also include any number of processors for processing data and executing computer-executable instructions, as well as other internal and peripheral components that are well known in the art. Further, the special purpose evaluation computer 106 may include or be in communication with any number of suitable memory devices operable to store data and/or computer-executable instructions. By executing computer-executable instructions, the evaluation computer 106 forms a special purpose computer or particular machine used for a particular purpose. As used herein, the term "computer-readable medium" describes any form of suitable memory or memory device.

As shown in FIG. 1, the merchant computer 104, evaluation computer 106, purchase processor computer 108, and database 182 may be in communication with each other via one or more networks, such as network 110, which, as described below, can include one or more separate or shared private and public networks, including the Internet or a publicly switched telephone network. Each of these components, the one or more merchant computers 104, evaluation computer 106, one or more purchase processor computers 108, database 182, and the network 110 will now be discussed in further detail.

Each merchant computer 104 may be associated with (e.g., located within or otherwise under the control and administration of) a seller of goods and services to acquiring parties. In one example, the merchant can be any one or more of a pharmacy, physician, clinic, physician's office, hospital, etc. Each merchant computer 104 may be any suitable processor-driven device that facilitates the creation of electronic product requests made by acquiring parties and the communication of information associated with electronic product requests to the evaluation computer 106, such as a server computer, a mainframe computer, one or more networked computers, a desktop computer, a personal computer, a digital assistant, a personal digital assistant, a digital tablet, an Internet appliance, an application-specific circuit, microcontroller, minicomputer, or any other processor-based device. In certain example embodiments, each merchant computer 104 may be a suitable point of sale (POS) device associated with (e.g., located within or otherwise under the control and administration of) a merchant of goods and/or services. The execution of the computer-implemented instructions by the merchant computer 104 may form a special purpose computer or other particular machine that is operable to facilitate the processing of electronic product request transactions for products and/or services requested by an acquiring party and the communication of information associated with electronic product requests to an evaluation computer 106. Additionally, in certain example embodiments, the operations and/or control of each merchant computer 104 may be distributed amongst several processing components.

In addition to having one or more processors 124, each merchant computer 104 may include one or more memory devices 126, one or more input/output ("I/O") interfaces 128, and one or more network interfaces 130. The memory devices 126 may be any suitable memory device, for example, caches, read only memory devices, random access memory devices, magnetic storage devices, removable storage devices, etc. The memory devices 126 may store data, executable instructions, and/or various program modules utilized by the merchant computer 104, for example, data files 132, an operating system ("OS") 134, and/or a client module 138, respectively. The data files 132 may include any suitable data that facilitates the generation and/or processing of requests for a product or service from an acquiring party at the merchant computer 104 and the generation and/or processing of electronic product requests that are communicated to the evaluation computer 106. For example, the data files 132 may include, but are not limited to, acquiring party information and/or contact information associated with one or more acquiring parties, information associated with the particular merchant and/or the respective merchant computer 104, information associated with the evaluation computer 106, information associated with one or more purchase processors (e.g., identifier codes identifying which purchase processor to electronically transmit the electronic product request for adjudication), purchase processor computers, and/or information associated with one or more electronic product requests. The OS 134 may be any suitable software module that controls the general operation of the merchant computer 104. The OS 134 may also facilitate the execution of other software modules by the one or more processors 124, for example, the client module 138. The OS 134 may be any currently existing or future developed operating system including, but not limited to, Microsoft Windows®, Apple OSX™, Linux, Unix, or a mainframe operating system.

The client module 138 may be an Internet browser or other suitable software, including a dedicated program, for interacting with the evaluation computer 106. For example, a user 120 such as an owner or employee of a merchant may utilize the client module 138 in preparing and transmitting electronic product requests to the evaluation computer 106 for delivery to the appropriate purchase processor computer 108 or other third-party for adjudication or other coverage/ benefits determination. The merchant computer 104 may also utilize the client module 138 to retrieve or otherwise receive data, messages, or responses from the evaluation computer 106 and/or other components of the system 100. For example, in certain example embodiments, the client module 138 may be utilized to receive an adjudicated electronic product request response from the evaluation computer 106 as will be described below.

The one or more I/O interfaces 128 may facilitate communication between the merchant computer 104 and one or more input/output devices, for example, one or more user interface devices, such as, a display, keypad, control panel, mouse, touch screen display, remote control, microphone, etc. that facilitate user interaction with the merchant computer 104. For example, the one or more I/O interfaces 128 may facilitate entry of information associated with an electronic product request by an employee 120 of a merchant. The one or more network interfaces 130 may facilitate connection of the merchant computer 104 to one or more suitable networks, for example, the network 110 illustrated in FIG. 1. In this regard, the merchant computer 104 may receive and/or communicate information to other network components of the system 100, such as the evaluation computer 106.

With continued reference to FIG. 1, the evaluation computer 106 is a special purpose processor-driven device that is configured for receiving, auditing, and fulfilling requests/transactions from the one or more merchant computers 104, the database 182, and/or the purchase processor computer 108. The evaluation computer 106 is an auditing system and switch/router that audits electronic product requests and routes electronic product requests between a merchant computer 104 associated with a seller of goods and/or services and a purchase processor computer 108 associated with a purchase processor. For example, the evaluation computer 106 may route electronic product requests electronically communicated from the merchant computer 104 to a purchase processor computer 108, or other third-party payor.

In certain example embodiments, the evaluation computer 106 may include a suitable host server, host module, or other software that facilitates the receipt of an electronic product request from a merchant computer 104, the auditing of the electronic product request and/or the routing of the received electronic product requests to a purchase processor computer 108. Any number of merchant computers 104, databases 182, and/or purchase processor computers 108 may be in communication with the evaluation computer 106, via the network 110 for example, as desired in various example embodiments.

The evaluation computer 106 is a special-purpose computer that may include any number of special purpose machines. In certain example embodiments, the operations of the evaluation computer 106 may be controlled by computer-executed or computer-implemented instructions that are executed by one or more processors associated with the evaluation computer 106 to form the special purpose computer or machine that is operable to facilitate the receipt, evaluation, auditing, editing, routing, and/or other processing of electronic product requests. The one or more processors that control the operations of the evaluation computer 106 may be incorporated into the evaluation computer 106 and/or in communication with the evaluation computer 106 via one or more suitable networks. In certain exemplary embodiments, the operations and/or control of the evaluation computer 106 may be distributed amongst several processing components.

The evaluation computer 106 may include one or more processors 140, one or more memory devices 142, one or more input/output ("I/O") interfaces 144, and one or more network interfaces 146. The one or more memory devices 142 may be any suitable memory devices, for example, caches, read only memory devices, random access memory devices, magnetic storage devices, removable memory devices, etc. The one or more memory devices 142 may store data, executable instructions, and/or various program modules utilized by the evaluation computer 106, for example, data files 148, an operating system ("OS") 150, the host module 154, an evaluation module 156, and a database management system ("DBMS") 152 to facilitate management of data files 148 and other data stored in the memory devices 142. The OS 150 may be a suitable software module that controls the general operation of the evaluation computer 106 and/or that facilitates the execution of other software modules. The OS 150 may be any currently existing or future-developed operating system.

The evaluation module 156 may be operable to perform one or more auditing processes based on one or more sets of business rules and may edit or otherwise modify one or more portions of a received electronic product request prior to routing or otherwise communicating the received electronic product request to a suitable purchase processor computer 108. Additionally, the evaluation module 156 may be operable to rout the adjudicated response to the electronic product request to the merchant computer 104 and prior to routing data from the electronic product request and/or adjudicated response to the electronic product request to the database 182. A wide variety of different evaluations, edits, or modifications to the electronic product request may be performed by the evaluation module 156 as desired in various example embodiments. For example, the module 156 may parse the electronic product request, retrieve data from certain fields of the electronic product request (e.g., acquiring party identifier information (e.g., acquiring party first name, acquiring party last name, acquiring party gender, acquiring party zip code, acquiring party address, acquiring party date of birth, acquiring party ID (e.g, driver's license number), etc.), merchant identifier information (e.g., merchant name, merchant address, merchant zip code, merchant state of business location, merchant identifier code, etc.) product identifier (e.g., product name, product alphanumeric code, quantity of the product, days' supply of the product, etc.), prescriber identifier, purchase processor identifier (e.g., purchase processor name, purchase processor identifier code), as well as other data within one or more fields of the electronic product request prior to adjudication and evaluate that data to determine if the request violates one or more audit parameters that result in the request being rejected prior to adjudication by the purchase processor computer 108.

In addition the module 156 may generate a rejection of the electronic product request and generate and insert messaging into the rejection that describes the basis for the rejection. The module 156 may further transmit the rejection or facilitate the transmission of the rejection to the merchant computer 104 from which the electronic product request originated. While the example evaluation module 156 is shown in FIG. 1 as being part of the evaluation computer 106, in alternative example embodiments, the evaluation module 156 is housed and operates from a computer system separate and distinct from the evaluation computer 106.

According to one example embodiment, the data files 148 may store electronic product requests, adjudicated responses to electronic product requests, and other request transaction records associated with communications received from various merchant computers 104 and/or various purchase processor computers 108. The data files 148 may also store any number of suitable routing tables that facilitate determining the destination of communications received from a merchant computer 104 or purchase processor computer 108. In certain example embodiments, the data discussed herein that is included in the database 182 may alternatively or also be stored in and accessed from the data files 148. The exemplary data files 148 may also store records containing, for example, merchant identification data, product identification data and records that associate related products, tables identifying merchants, negative product interactions, product safe-use thresholds, and/or refill or repurchase timing for each product.

The host module 154 may receive, process, and respond to requests/responses from the client module 138 of the merchant computer 104 and may further receive, process, and respond to requests/responses of the host module 172 of the purchase processor computer 108. The evaluation computer 106 may include additional program modules for performing other processing methods described herein. Those of ordinary skill in the art will appreciate that the evaluation computer 106 may include alternate and/or additional components, hardware or software without departing from the example embodiments disclosed herein.

With continued reference to the evaluation computer 106, the one or more I/O interfaces 144 may facilitate communication between the evaluation computer 106 and one or more input/output devices, for example, one or more user interface devices, such as a display, keypad, control panel, touch screen display, mouse, remote control, microphone, etc. that facilitates user interaction with the evaluation computer 106. The one or more network interfaces 146 may facilitate connection of the evaluation computer 106 to one or more suitable networks, for example, the network 110 illustrated in FIG. 1. In this regard, the evaluation computer 106 may communicate with other components of the system 100.

The database 182 of FIG. 1 represents one or more databases that can be locally or remotely distributed with respect to the evaluation computer 106 and communicably connected thereto. The database 182 may be operable to store information associated with various merchants and acquiring parties and/or from various electronic product requests that have been approved/paid during the adjudication process by the multitude of purchase processors via the associated purchase processor computers 108. The database 182 may also receive and store product data and historical records for the acquiring party. In addition, the database 182 may also receive and store tables of negative product interactions, toxicity levels for each product, and tables of products associated with one-another or in the same therapeutic class (e.g., searchable via the product identifier). The database 182 may also receive and store business rules for determining how electronic product requests are to be audited, historical records of completed electronic product requests, auditing parameters and business rules provided for each merchant or group of merchants (e.g., a chain of stores affiliated with one another) to be used in auditing the electronic product requests, one or more rejection messages to be used when an electronic product request is flagged or rejected as part of the automated auditing process, other similar parameter information used for auditing process. In addition, the database 182 may receive and store one or more rejection notification templates reject codes, and/or text-based messages providing an indication of the reason(s) why the electronic product request was rejected during the audit process. Further, the database 182 may receive and store a schedule of merchants (e.g. searchable via a merchant identifier) that are eligible to receive the auditing of transactions. The data in the database 182 may then be accessed and evaluated by the evaluation computer 106, such as by the evaluation module 156.

With continued reference to FIG. 1, the purchase processor computer 108 may be any suitable processor-driven device that facilitates receiving, processing, and/or fulfilling electronic product requests from the evaluation computer 106. For example, the purchase processor computer 108 may be a processor-driven device associated with a purchase processor. As desired, the purchase processor computer 108 may include any number of application-specific circuits, microcontrollers, personal computers, minicomputers, mainframe computers, servers, and the like.

In certain exemplary embodiments, the operations of the purchase processor computer 108 may be controlled by computer-executed or computer-implemented instructions that are executed by one or more processors associated with the purchase processor computer 108 that is operable to facilitate the receipt, processing, and/or fulfillment of electronic product requests received from the evaluation computer 106. The one or more processors that control the operations of the purchase processor computer 108 may be incorporated into the purchase processor computer 108 and/or in communication with the purchase processor computer 108 via one or more suitable networks. In certain example embodiments, the operations and/or control of the purchase processor computer 108 may be distributed amongst several processing components.

The purchase processor computer 108 may include one or more processors 158, one or more memory devices 160, one or more input/output ("I/O") interface(s) 162, and one or more network interfaces 164. The one or more memory devices 160 may be any suitable memory devices, for example, caches, read only memory devices, random access memory devices, magnetic storage devices, removable memory devices. The one or more memory devices 160 may store data, executable instructions, and/or various program modules utilized by the purchase processor computer 108, for example, data files 166, an operating system ("OS") 168, a database management system ("DBMS") 170, and a host module 172. The data files 166 may include any suitable information that is utilized by the purchase processor computer 108 to process electronic product requests, for example, acquiring party profiles, acquiring party purchase plan information (e.g., healthcare insurance), other information associated with an acquiring party, information associated with a merchant, etc. The OS 168 may be a suitable software module that controls the general operation of the purchase processor computer 108. The OS 168 may also facilitate the execution of other software modules by the one or more processors 158, for example, the DBMS 170 and/or the host module 172. The OS 168 may be any currently existing or future-developed operating system including, but not limited to, Microsoft Windows®, Apple OSX™, Linux, Unix, or a mainframe operating system.

The DBMS 170 may be a suitable software module that facilitates access and management of one or more databases that are utilized to store information that is utilized by the purchase processor computer 108 in various example embodiments. The host module 172 may initiate, receive, process, and/or respond to requests, such as electronic product requests, from the host module 154 of the evaluation computer 106. The purchase processor computer 108 may include additional program modules for performing other pre-processing or post-processing methods described herein. Those of ordinary skill in the art will appreciate that the purchase processor computer 108 may include alternate and/or additional components, hardware or software without departing from the example embodiments described herein.

The one or more I/O interfaces 162 may facilitate communication between the purchase processor computer 108 and one or more input/output devices, for example, one or more user interface devices, such as a display, keypad, control panel, mouse, touch screen display, remote control, microphone, etc. that facilitate user interaction with the purchase processor computer 108. The one or more network interfaces 164 may facilitate connection of the purchase processor computer 108 to one or more suitable networks, for example, the network 110. In this regard, the purchase processor computer 108 may receive electronic product requests and/or other communications from the evaluation computer 106 and the purchase processor computer 108 may communicate information associated with processing the electronic product requests to the evaluation computer 106.

The network 110 may include any telecommunication and/or data network, whether public, private, or a combination thereof, including a local area network, a wide area network, an intranet, the Internet, intermediate hand-held data transfer devices, and/or any combination thereof and may be wired and/or wireless. The network 110 may also allow for real-time, off-line, and/or batch transactions to be transmitted between or among the merchant computer 104, the evaluation computer 106, the database 182, and/or the purchase processor computer 108. Due to network connectivity, various methodologies, as described herein may be practiced in the context of distributed computing environments. Although the evaluation computer 106 is shown for simplicity as being in communication with the merchant computer 104, the database 182, or the purchase processor computer 108 via one intervening network 110, it is to be understood that any other network configuration is possible. For example, intervening network 110 may include a plurality of networks, each with devices such as gateways and routers for providing connectivity between or among networks 110. Instead of or in addition to a network 110, dedicated communication links may be used to connect the various devices in accordance with an example embodiment. For example, the evaluation computer 106 may form the basis of network 110 that interconnects one or more of the merchant computer 104, the database 182, and the purchase processor computer 108.

Those of ordinary skill in the art will appreciate that the system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. For example, in one exemplary embodiment, the evaluation computer 106 (or other computer) is implemented as a specialized processing machine that includes hardware and/or software for performing the methods described herein. Accordingly, the exemplary embodiments described herein should not be construed as being limited to any particular operating environment, system architecture, or device configuration.

Operational Overview

Figure 2A:
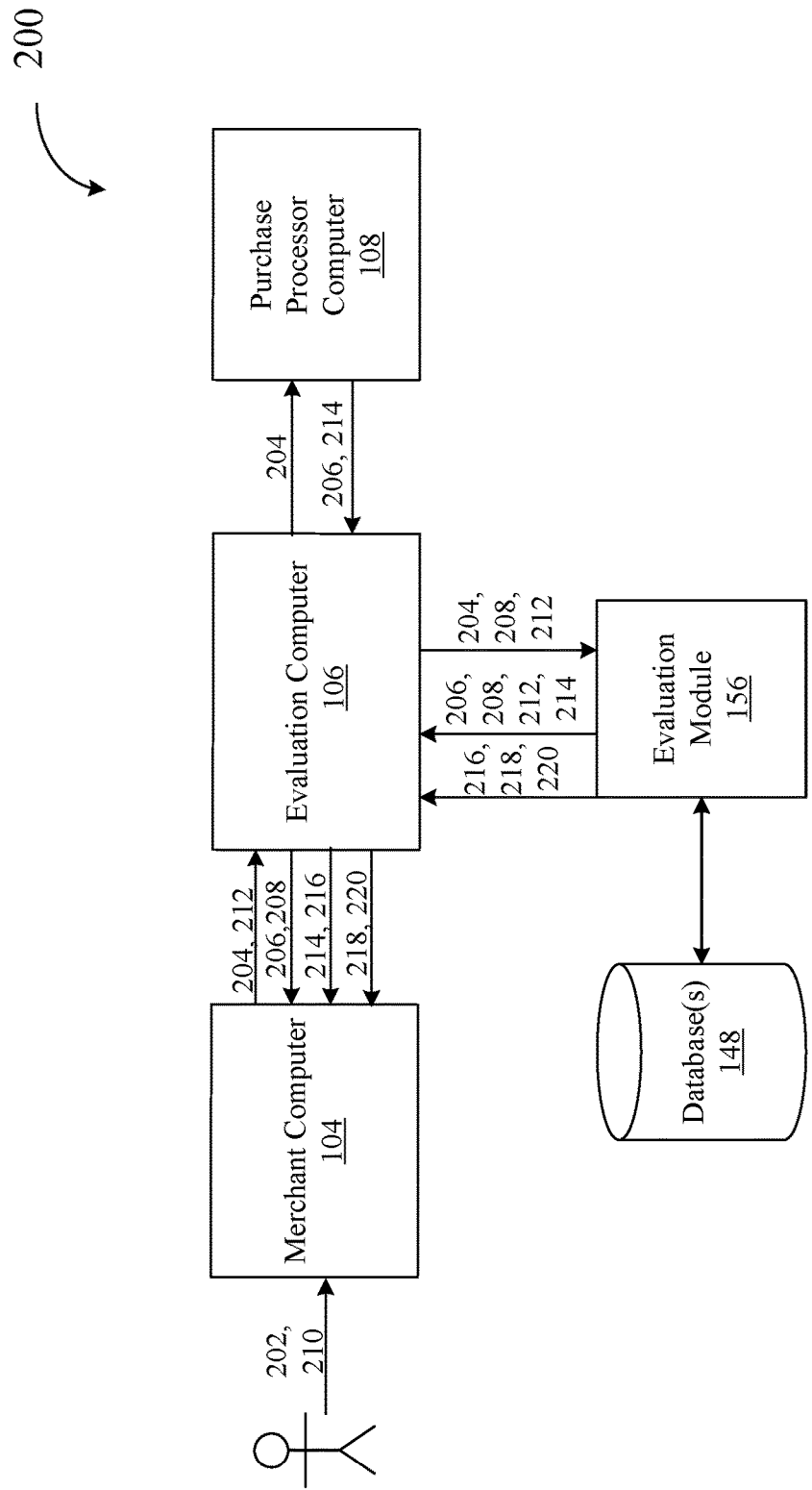
FIG. 2A is a diagram of an example system flow for auditing purchase transactions according to one example embodiment of the disclosure.
Figure 3A:
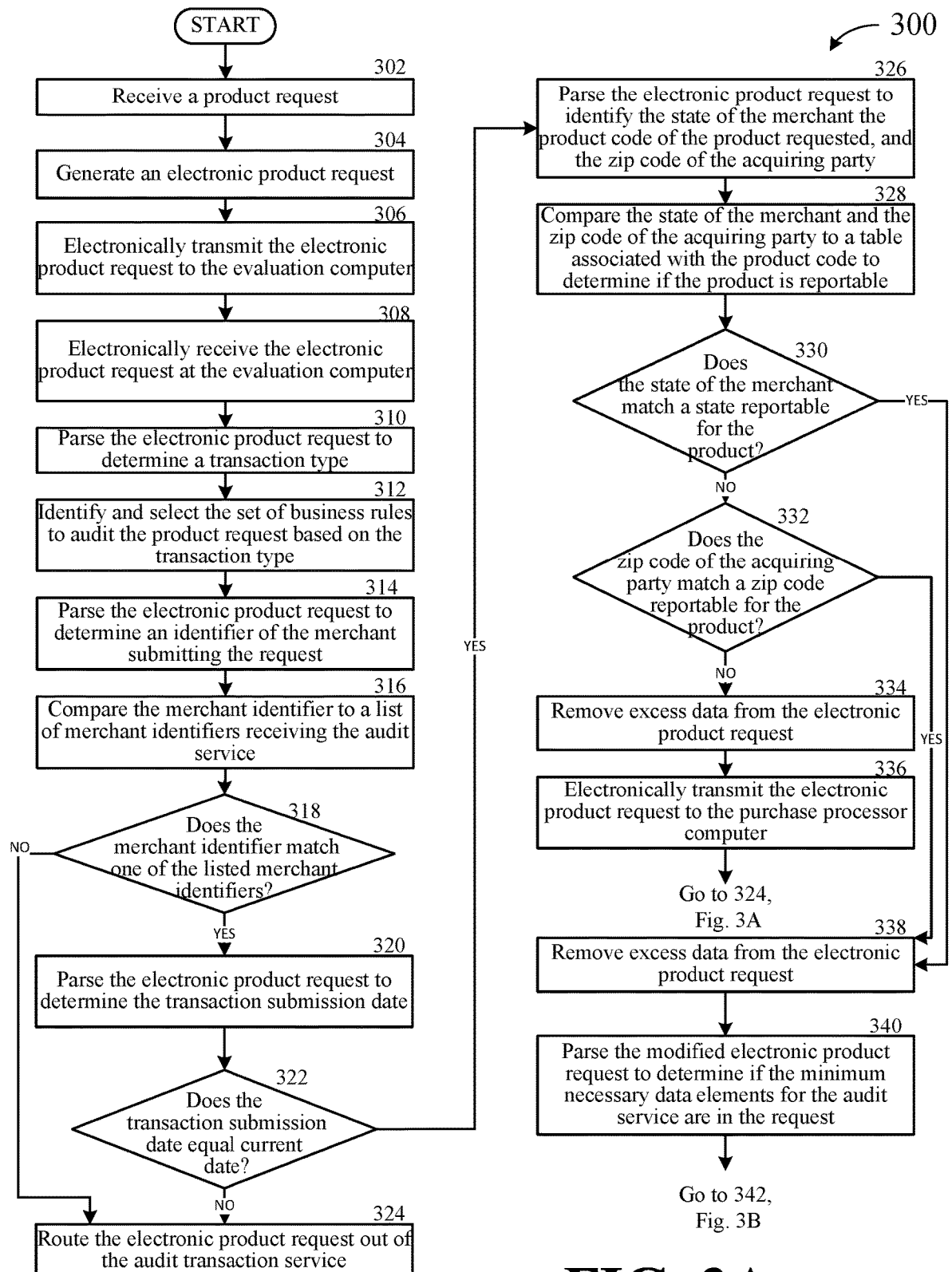
FIGS. 3A-B are an example methodology for auditing and storing purchase transactions according to one example embodiment of the disclosure.
Figure 3B:
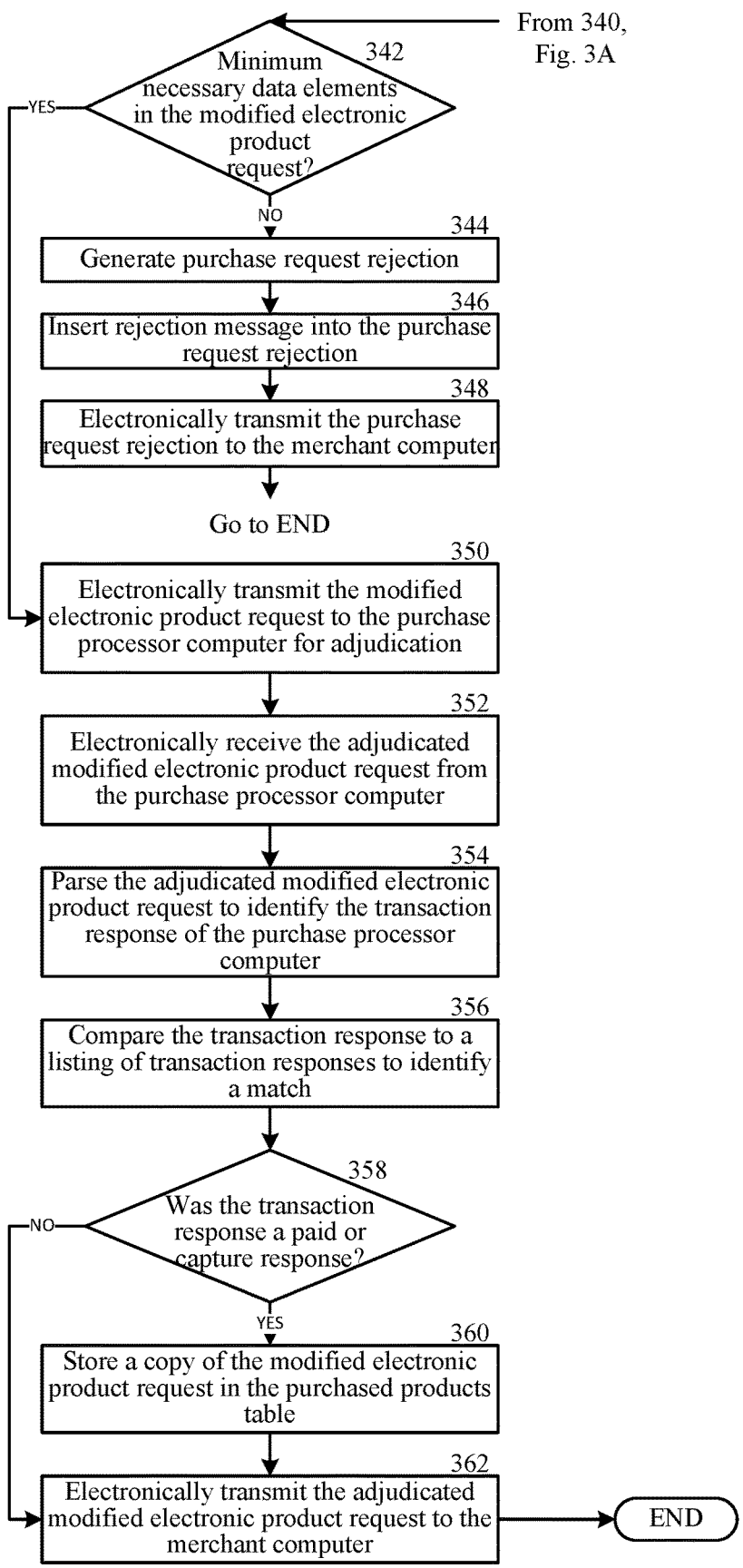

FIG. 2A is a diagram of one example system flow 200A for auditing purchase transactions, such as through the evaluation computer 106 illustrated in FIG. 1. FIGS. 3A-3B are an example methodology 300 for auditing and storing purchase transactions according to one example embodiment of the disclosure. All or a portion of the elements in the example method 300, described below, may be performed by a suitable evaluation computer 106.

In addition, the exemplary methodology 300 described below will be described with reference to an electronic product request; however, this also is only for purposes of example as other electronic purchase requests (which may include, for example, electronic healthcare transactions, such as predetermination of benefits transactions healthcare billing transactions (e.g., healthcare claim transaction, or prescription claim transaction or prescription billing request), an electronic prescription (i.e., electronic prescription order transaction, e-script, or e-prescription)) could be substituted for the electronic product request and each form of electronic purchase request should each individually be read as being used in the methods described below.

Referring now to FIGS. 1, 2A, and 3A-3B, the example methodology 300 begins at the START block and proceeds to block 302, where a product purchase request 202 is received. In one example embodiment, the product purchase request 202 is received by a merchant at a merchant store location. The product purchase request 202 may be received from an acquiring party, a healthcare provider prescribing a medication or service (e.g., physician, hospital, etc.), by phone, via the Internet, via an electronic prescription (i.e., electronic prescription order transaction, e-script, or e-prescription) or by way of an electronic system order. In one example, the acquiring party can be a purchaser. For example, the product purchase request 202 may be received by the purchaser from a prescriber of a product or service, such as a medication or other product or service. The purchaser may go to the store location of the merchant and physically hand the product purchase request 202 to the merchant employee or make a request via a web portal communicably coupled to the merchant computer 104 or an IVR communicably coupled or otherwise providing order data to the merchant computer 104. The merchant employee determines the purchaser's name and accesses the merchant computer 104, which receives a selection of purchaser information from the merchant employee via the I/O interface 128. For example, the merchant employee accesses the merchant computer 104 and accesses a database of purchaser information, which may be stored in memory 126 or in another database either local or remote from the merchant computer 104. The merchant employee can then select the name or other purchaser identification information in the purchaser information database that matches the name or other identification information of the purchaser. In certain example embodiments, this information from the database includes a purchase plan identifier for the request, such as the Payor ID/routing information (e.g., BIN Number; BIN Number and PCN; BIN Number and Group ID; BIN Number, PCN and Group ID; BIN Number, PCN, Group ID, and Cardholder ID (of purchaser); BIN Number, PCN, Group ID, Cardholder ID (of purchaser), Relationship Code (of purchaser), and Person Code (of purchaser); and/or BIN Number, PCN, Group ID, Cardholder ID (of purchaser), Relationship Code (of purchaser), Person Code (of purchaser), Purchaser Date of Birth, and Purchaser Gender) that identifies the purchase processor computer 108 intended to receive and adjudicate the electronic product request 204.

In block 304, an electronic product request 204 is generated and/or formatted at the merchant computer 104. In one example embodiment, the electronic product request 204 is an electronic product purchase request. In certain exemplary embodiments, the merchant computer 104 formats the electronic product request 204 with purchaser information, purchase plan identifier information, and the product to be purchased (e.g., medications, devices, etc.) or service information, the quantity of the product or service to be purchased by the purchaser and the days' supply of the product or service that the purchaser will be receiving. The information can be input into the electronic product request 204 by the merchant employee via the I/O interface 128 or automatically retrieved and entered by the merchant computer 104 based at least in part on historical transaction information for the purchaser in the data files 132 or a database communicably coupled to the merchant computer 104. In certain example embodiments, the merchant computer 104 may be a pharmacy computer or healthcare provider computer associated with (e.g., located within and/or providing computing services for) a pharmacy or other healthcare provider, such as, for example, a pharmacy, physician, physician's office, hospital, clinic, etc. According to one example embodiment, the electronic product request 204 may be an electronic transaction having a multitude of data fields for receiving data therein. Each field may be formatted to receiving a particular type of data, which may include numeric data, alphanumeric data, etc.

As discussed above, the electronic product request 204 may include fields for including data representing a BIN Number; BIN Number and PCN; BIN Number and Group ID; and/or BIN Number, PCN, and Group ID for identifying a particular purchase processor computer 108 (e.g., pharmacy benefits manager, healthcare insurance company, Medicare or other government healthcare insurance payor, Medicare Part D provider, etc.), such as the purchase processor computer 108, as a destination for the electronic product request 204. In addition, the electronic product request 204 may also include information relating to the purchaser, purchase plan, prescriber, merchant, and/or the requested product or service. As an example, the electronic product request 204 may include fields of data that include one or more of the following information:

Purchase plan identifier-Payor ID/Routing Information
BIN Number (i.e. Banking Identification Number); BIN Number and Processor Control Number (PCN); BIN Number and Group ID; BIN Number, PCN and Group ID; BIN Number, PCN, Group ID, and Cardholder ID (of purchaser); BIN Number, PCN, Group ID, Cardholder ID (of purchaser), Relationship Code (of purchaser), and Person Code (of purchaser); and/or BIN Number, PCN, Group ID, Cardholder ID (of purchaser), Relationship Code (of purchaser), Person Code (of purchaser), Purchaser Date of Birth, and Purchaser Gender that designates a destination (e.g., the purchase processor computer 108) of the electronic product request 204
Purchaser Information
Name (e.g. Purchaser Last Name, Purchaser First Name, etc.)
Date of Birth of Purchaser
Gender of Purchaser
Purchaser Address (e.g. Street Address, Zip Code, etc.)
Purchaser Contact Information (e.g. purchaser telephone number, email address, etc.)
Purchaser ID or other identifier (e.g., driver's license number, social security number, Health Insurance Claim Number (HICN), etc.)
Purchase Plan Information
Cardholder Name (e.g. Cardholder First Name, Cardholder Last Name)
Cardholder ID and/or other identifier (e.g. person code)
Group ID and/or Group Information
Transaction Type
Transaction Type Code (e.g., product purchase request (e.g., billing transaction), reversal transaction, e-script transaction, benefits determination request)
Prescriber of the Product Information
Prescriber ID or other identifier (e.g. prescriber code)
Prescriber Name (e.g. Last Name, First Name)
Prescriber Contact Information (e.g. Telephone Number)
Merchant Information
Merchant Information (e.g. store name, store address, chain identifier, etc.)
Merchant ID (e.g. merchant code)
Product Information
Product information—Product or service identifier (e.g. product code, UPC code, NDC code, etc.), product or service name, etc.
Purchase Reference Number
Quantity of Product to be Dispensed
Days' Supply of the Product Purchased
Pricing information for the product or service (e.g. ingredient cost (e.g., in an Ingredient Cost field), dispensing fee (e.g., in a Dispensing Fee field), gross amount due (e.g., in a Gross Amount Due field), and Usual and Customary Charge amount (e.g., in a Usual and Customary Charge field))
Number of Refills Authorized
Fill Number (i.e., the current refill number for the current request 204)
Transaction Submission Date of the Electronic Product Request (the original date that the Electronic Product Request was electronically submitted to the evaluation computer 106.

The electronic product request 204 can be used to determine if the purchase plan associated with the purchase processor computer 108 approves or rejects payment coverage for the product or service being requested in the electronic product request 204 and, if approved, the amount the purchase plan will cover (or pay) for the product or service being requested and how much the purchaser pay amount (the amount the purchaser is responsible to pay for) will be.

The merchant computer 104 electronically transmits the electronic product request 204 to the evaluation computer 106 in block 306. In block 308, the evaluation computer 106 electronically receives the electronic product request 204. For example, the electronic product request 204 can be electronically transmitted by the merchant computer 104 to the evaluation computer 106 through the network 110. In block 310, the evaluation module 156 or another portion of the evaluation computer 106 can parse the electronic product request 204 to determine a transaction type for the electronic product request 204 in one of the fields of the request 204. In one example, the transaction type can be a code that identifies the request 204 as a billing transaction request. At block 312, the evaluation module 156 or another portion of the evaluation computer 106 can compare the transaction type to a table or schedule of transaction types in, for example, the database 182 to identify a matching transaction type and, based on the match select a set of business rules used to examine or audit the electronic product request 204.

At block 314, the evaluation module 156 or another portion of the evaluation computer 106 can parse the electronic product request 204 to locate and identify the field and data within the field representing the merchant identifier code that identifies the seller of the product in the request 204. At block 316, the evaluation module 156 or another portion of the evaluation computer 106 can compare the merchant identifier code to a table or schedule of merchant codes in, for example, the database 182 for merchants that have signed up for or are otherwise authorized to receive the evaluation service (e.g., a transaction auditing service) to determine if the merchant identifier code from the request 204 matches at least one of the merchant codes. At block 318, an inquiry is conducted to determine if the merchant identifier code from the request 204 matches one of the merchant codes. In one example, the determination can be made by the evaluation module 156 or another portion of the evaluation computer 106. If the merchant identifier code does not match a merchant code for merchants receiving the transaction audit service, the NO branch can be followed to block 324. If the merchant identifier code does match a merchant code, then the YES branch can be followed to block 320.

In block 320, the evaluation module 156 or another portion of the evaluation computer 106 can parse the electronic product request 204 to locate and identify the field and data within the field representing the transaction submission date for the electronic product request 204. In block 322, an inquiry is conducted to determine if the transaction submission date is equal to today's date. In one example, the determination can be made by the evaluation module 156 or another portion of the evaluation computer 106. If the transaction submission date is not equal to today's date, then the NO branch can be followed to block 324, where the evaluation module 156 or another portion of the evaluation computer 106 can route the electronic product request 204 out of the transaction audit service and the request 204 can be processed outside of the described methodology. If the transaction submission date is equal to today's date, then the YES branch can be followed to block 326.

In block 326, the evaluation module 156 or another portion of the evaluation computer 106 can parse the electronic product request 204 to locate and identify the field and data within the field representing the state that the merchant business is located. In one example, this data can be included in the merchant address or other merchant identifier information within the request 204. In addition, the evaluation module 156 or another portion of the evaluation computer 106 can parse the electronic product request 204 to locate and identify the field and data within the field representing the product code for the product requested and the zip code of the residence of the purchaser.

In block 328, an inquiry is conducted to determine if the state that the merchant business is located matches one of the states that requires reporting of product sales for the product identified by the product code in the request 204. In one example, the determination can be made by the evaluation module 156 or another portion of the evaluation computer 106. For example, the evaluation module 156 can identify the states that require reporting by searching based on the product code from the request 204 in, for example, the database 182 and can then compare the state of the merchant business to the table or schedule of one or more states that require reporting for that particular product to determine if a match exists. If the state of the merchant business matches a state that requires purchase reporting for the product identified in the request 204, then the YES branch can be followed to block 338. If the state of the merchant business does not match a state that requires purchase reporting for the product identified in the request 204, then the NO branch can be followed to block 332.

In block 332, an inquiry is conducted to determine if the zip code of the purchaser of the product in the request 204 matches one of the zip codes that requires reporting of product sales for the product identified by the product code in the request 204. In one example, the determination can be made by the evaluation module 156 or another portion of the evaluation computer 106. For example, the evaluation module 156 can identify the zip codes that require reporting by searching based on the product code from the request 204 in, for example, the database 182 and can then compare the zip code of the purchaser to the table or schedule of one or more zip codes that require reporting for that particular product to determine if a match exists. If the zip code of the purchaser matches a zip code that requires purchase reporting for the product identified in the request 204, then the YES branch can be followed to block 338. If the zip code of the purchaser does not match a zip code that requires purchase reporting for the product identified in the request 204, then the NO branch can be followed to block 334.

At block 334, excess data can be removed from the electronic product request 204. In one example, the excess data can include, but is not limited to, data that is not needed for the purchase process computer 108 to make an adjudication with regard to the request 204. For example, the excess data can include the purchaser's driver's license number. In one example, the removal of excess data may be completed by the evaluation module 156 or another portion of the evaluation computer 106. At block 336, the evaluation module 156 or another portion of the evaluation computer 106 can electronically transmit the electronic product request 204 to the purchase processor computer 108. In one example, the electronic product request 204 can be electronically transmitted to the purchase processor computer 108 via the network 110. In one example embodiment, the purchase process computer 108 can be a claims processor computer associated with a claims processor, pharmacy benefits manager, or healthcare insurance provider. The process can then proceed to block 324, where the particular request is routed out of the audit transaction service.

In block 338, excess data can be removed from the electronic product purchase request 204 to create a modified electronic product request 204. In one example, the excess data can include, but is not limited to, data that is not needed for the purchase process computer 108 to make an adjudication with regard to the request 204. For example, the excess data can include the purchaser's driver's license number. In one example, the removal of excess data may be completed by the evaluation module 156 or another portion of the evaluation computer 106. In block 340, the evaluation module 156 or another portion of the evaluation computer 106 can parse the modified electronic product request 204 to determine if the minimum necessary data elements for the audit service are in the request 204. In one example, the minimum necessary data elements can include purchaser first name, purchaser last name, purchaser date of birth, purchaser gender, purchaser zip code, product identifier, quantity of product being purchased, and transaction submission date. In one example, the evaluation module 156 can compare the list of minimum necessary elements to the request 204 and determine if the fields of each of those elements in the request 204 includes proper (e.g., in the correct format) and sufficient data for each of the elements. At block 342, an inquiry is conducted to determine if the modified electronic product request 204 includes the necessary data elements for the transaction audit service. In one example, the determination can be made by the evaluation module 156 or another portion of the evaluation computer 106. If the modified electronic product request 204 includes the minimum necessary elements, the YES branch can be followed to block 350. If the modified electronic product request 204 does not include the minimum necessary elements, the NO branch can be followed to block 344.

In block 344, the evaluation module 156 or another portion of the evaluation computer 106 can generate a purchase request rejection 206. This purchase request rejection 206 can be generated without sending the electronic product request 204 to the purchase processor computer 108 for purchase adjudication. In block 346, the evaluation module 156 or another portion of the evaluation computer 106 can insert a rejection message into the purchase request rejection 206. In one example, the rejection message can be retrieved from the database 182 and can provide a detailed explanation as to why the electronic product request 204 was rejected by the evaluation computer 106. In block 348, the evaluation module 156 or another portion of the evaluation computer 106 can electronically transmit the purchase request rejection 206 to the merchant computer 104. In one example, the purchase request rejection 206 can be electronically transmitted to the merchant computer 104 via the network 110. The process can then continue to the END block.

In block 350, the evaluation module 156 or another portion of the evaluation computer 106 can electronically transmit the modified electronic product request 204 to the purchase processor computer 108 for purchase adjudication. Purchase adjudication can include determining if the purchase plan authorizes the purchase, determining the total amount to be paid for the product requested in the request 204, determining if and how much of the purchase price will be covered (e.g., paid) by the purchase plan associated with the purchase process computer 108, and determining the amount that the purchase has to pay (the purchase pay amount) for the purchase to be completed. In one example, the modified electronic product request 204 can be electronically transmitted to the purchase processor computer 108 via the network 110.

In block 352, the evaluation computer 106 can electronically receive an adjudicated modified electronic product request 208 from the purchase processor computer 108 via, for example, the network 110. In one example, the adjudicated modified electronic product request 208 is an adjudicated response to a healthcare transaction, such as a predetermination of benefits request, healthcare claim transaction, prescription claim request, prescription billing request, or healthcare order transaction. In block 354, the evaluation module 156 or another portion of the evaluation computer 106 can parse the adjudicated modified electronic product request 208 to locate and identify the field and data within the field representing the transaction response of the purchase processor computer 108. In certain examples, the transaction response can be a code representing one of the following: capture, duplicate of capture, paid, duplicate of paid, or rejected. In block 356, the evaluation module 156 or another portion of the evaluation computer 106 can compare the transaction response from the adjudicated request 208 to a listing of transaction responses for which storage of the request 204 will occur to determine if a match exists. In one example, the list of transaction responses for which storage of the request or its data will occur can be retrieved by the evaluation module 156 or another portion of the evaluation computer 106 from the database 182. In one example, the list of transaction responses for which storage of the request 204 or its data will occur are adjudication codes representing capture, duplicate of capture, paid, or duplicate of paid.

In block 358, an inquiry is conducted to determine if the match exists and the transaction response in the adjudicated request 208 is a code representing one of capture, duplicate of capture, paid, or duplicate of paid. In one example, the determination can be made by the evaluation module 156 or another portion of the evaluation computer 106. If a match does exist, then the YES branch can be followed to block 360, where the evaluation module 156 or another portion of the evaluation computer 106 can store a copy of the modified electronic product request 204 or its data contents in a purchase products table in, for example, the database 182. In certain example embodiments, the electronic product request 204 and modified electronic product request 204 can be any one of a healthcare claim transaction, prescription claim request, prescription billing request, healthcare order transaction, or e-prescription request (e.g., electronic prescription order transaction, e-script, or e-prescription). The process can then continue to block 362. Returning to the inquiry of block 358, if a match does not exist, then the NO branch can be followed to block 362. In block 362, the evaluation module 156 or another portion of the evaluation computer 106 can electronically transmit the adjudicated modified electronic product request 208 to the merchant computer 104 via, for example, the network 110. The process can then continue to the END block.

Figure 4A:
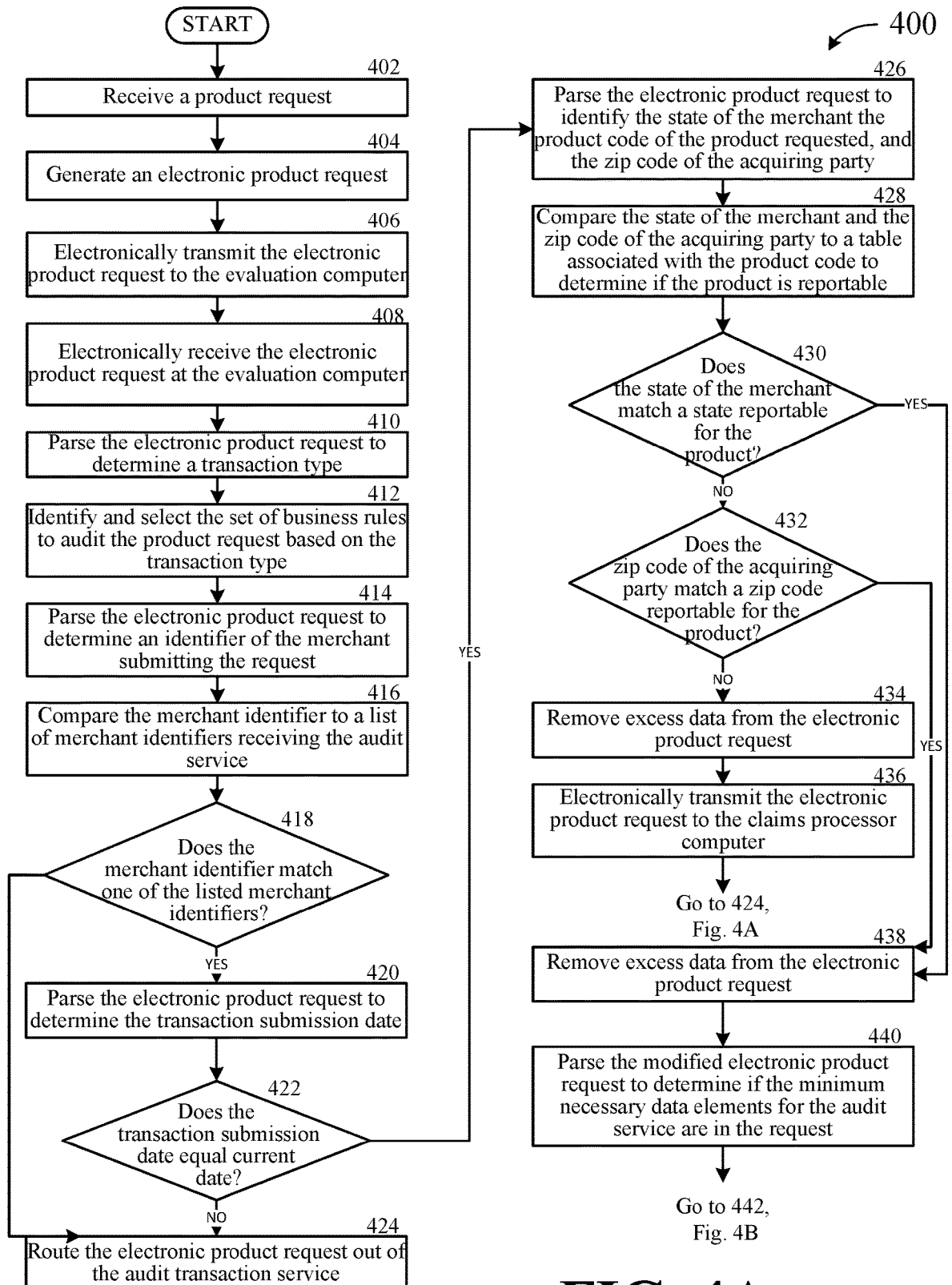
FIGS. 4A-C are an example methodology for auditing purchase transactions and generating notifications to merchants when audit parameters are violated according to one example embodiment of the disclosure.
Figure 4B:
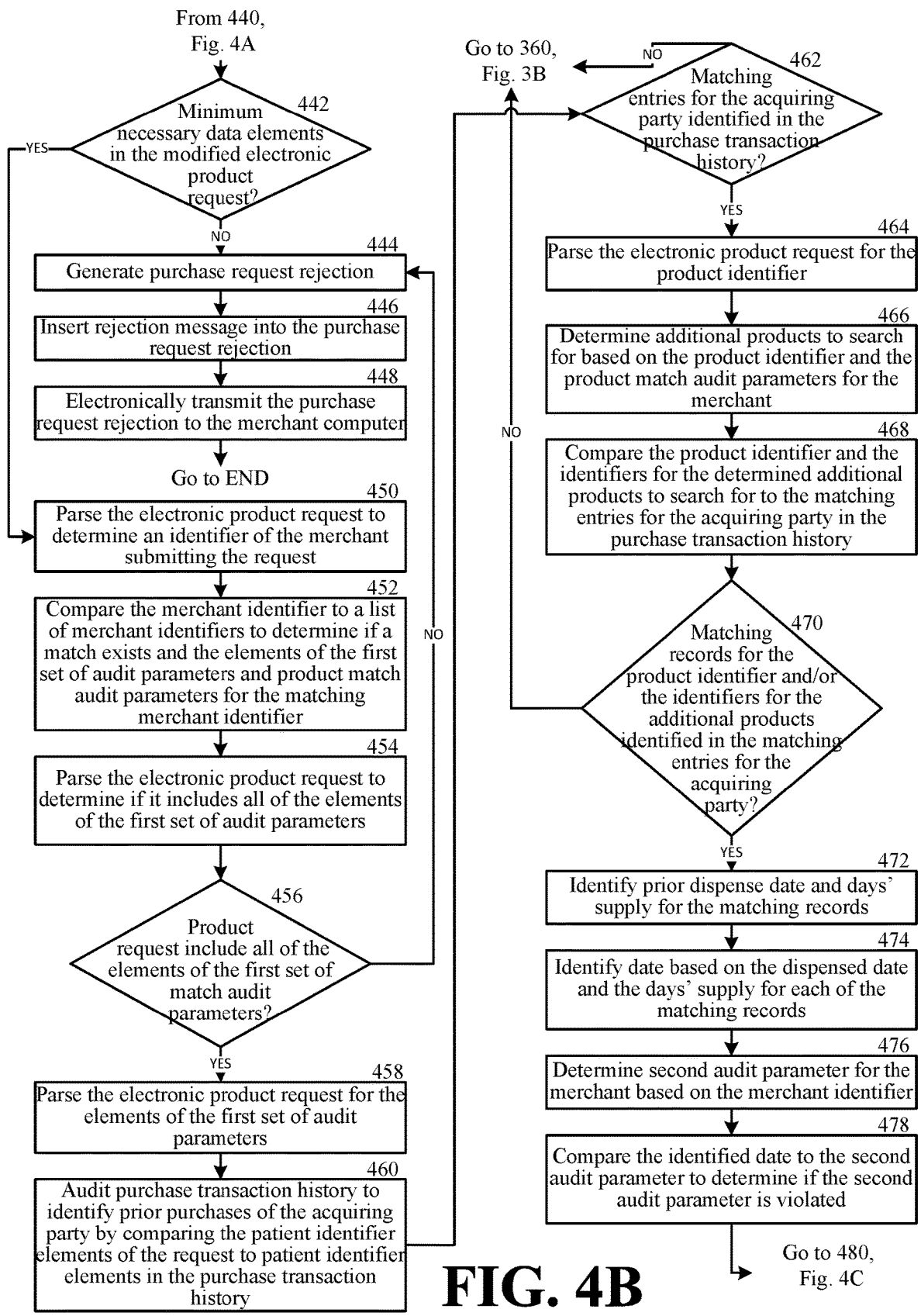
Figure 4C:
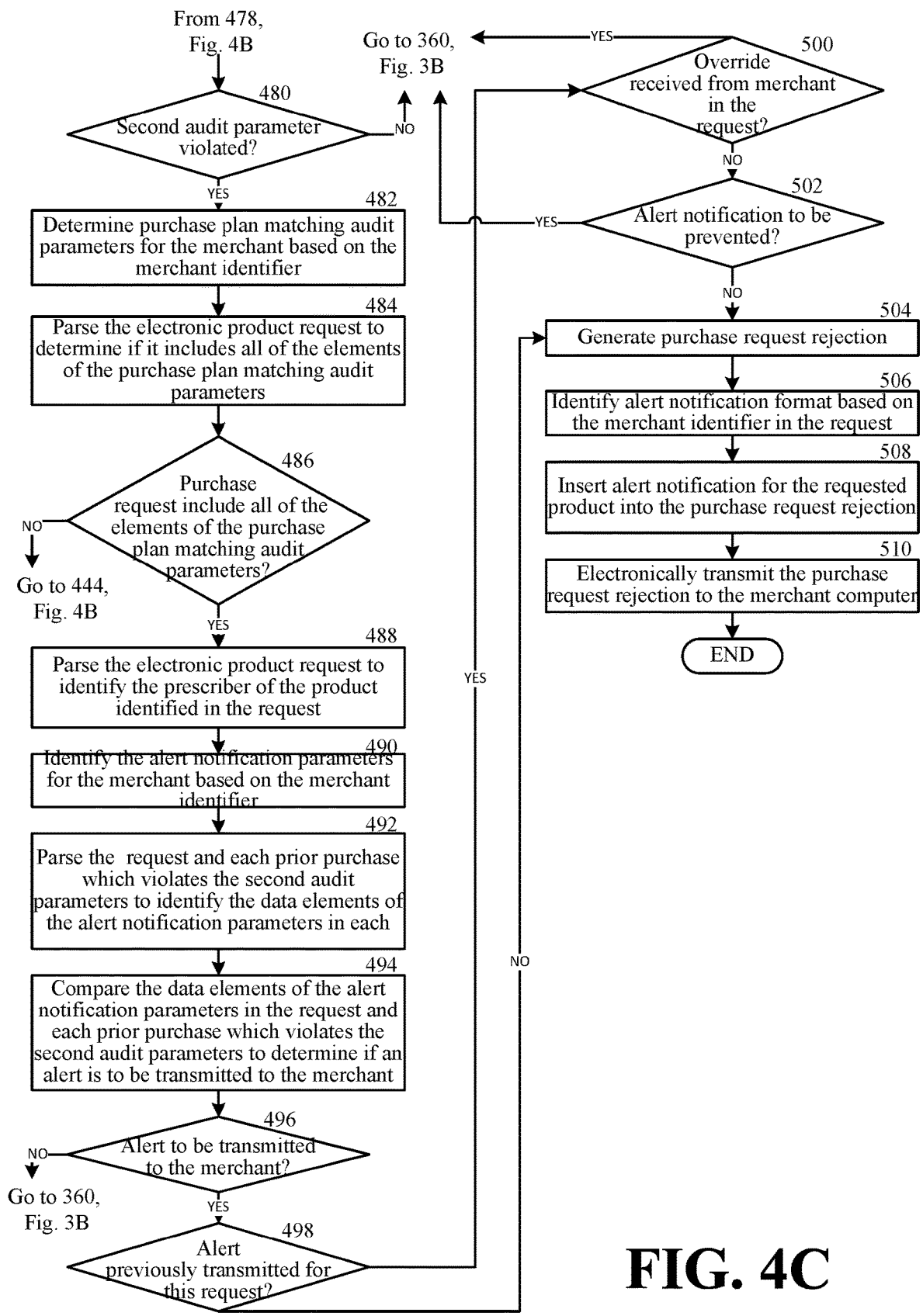

FIGS. 4A-4C are an example methodology 400 for auditing purchase transactions and generating notifications to merchants when audit parameters are violated according to one example embodiment of the disclosure. All or a portion of the elements in the example method 400, described below, may be performed by a suitable evaluation computer 106.

In addition, the exemplary methodology 400 described below will be described with reference to an electronic product request; however, this also is only for purposes of example as other electronic purchase requests (which may include, for example, electronic healthcare transactions, such as predetermination of benefits transactions healthcare billing transactions (e.g., healthcare claim transaction, or prescription claim transaction or prescription billing request), an electronic prescription (i.e., electronic prescription order transaction, e-script, or e-prescription)) could be substituted for the electronic product request and each form of electronic purchase request should each individually be read as being used in the methods described below.

Referring now to FIGS. 1, 2A, and 3A-4C, the example methodology 400 begins at the START block and proceeds to block 402, where a product request 210 is received. In one example embodiment, the product request 210 is received by a merchant at a merchant store location. The product request 210 may be received from a purchaser, a healthcare provider prescribing a medication or service (e.g., physician, hospital, etc.), by phone, via the Internet, via an electronic prescription (i.e., electronic prescription order transaction, e-script, or e-prescription) or by way of an electronic system order. For example, the product request 210 may be received by the purchaser from a prescriber of a product or service, such as a medication or other product or service. In certain example embodiments, the purchaser is a patient or an agent of the patient. Further, the prescriber can be a physician, hospital, nurse or any person or entity legally permitted to prescribe medications, products, and/or services). The purchaser may go to the store location of the merchant and physically hand the product request 210 to the merchant employee or make a request via a web portal communicably coupled to the merchant computer 104 or an IVR communicably coupled or otherwise providing order data to the merchant computer 104. The merchant employee determines the purchaser's name and accesses the merchant computer 104, which receives a selection of purchaser information from the merchant employee via the I/O interface 128. For example, the merchant employee accesses the merchant computer 104 and accesses a database of purchaser information, which may be stored in memory 126 or in another database either local or remote from the merchant computer 104. The merchant employee can then select the name or other purchaser identification information in the purchaser information database that matches the name or other identification information of the purchaser. In certain example embodiments, this information from the database includes a purchase plan identifier for the request, such as the Payor ID/routing information (e.g., BIN Number; BIN Number and PCN; BIN Number and Group ID; and/or BIN Number, PCN and Group ID) that identifies the purchase processor computer 108 intended to receive and adjudicate the electronic product request 212.

In block 404, an electronic product request 212 is generated and/or formatted at the merchant computer 104. In one example, the electronic product request 212 is an electronic product purchase request. In certain exemplary embodiments, the merchant computer 104 formats the electronic product request 212 with purchaser information, purchase plan identifier information, and the product to be purchased (e.g., medications, devices, etc.) or service information, the quantity of the product or service to be purchased by the purchaser and the days' supply of the product or service that the purchaser will be receiving. The information can be input into the electronic product request 212 by the merchant employee via the I/O interface 128 or automatically retrieved and entered by the merchant computer 104 based at least in part on historical transaction information for the purchaser in the data files 132 or a database communicably coupled to the merchant computer 104. According to one example embodiment, the electronic product request 212 may be an electronic transaction having a multitude of fields for receiving data therein. Each field may be formatted to receiving a particular type of data, which may include numeric data, alphanumeric data, etc.

As discussed above, the electronic product request 212 may include fields for including data representing a BIN Number; BIN Number and PCN; BIN Number and Group ID; and/or BIN Number, PCN and Group ID for identifying a particular purchase processor computer 108 (e.g., pharmacy benefits manager, healthcare insurance company, Medicare or other government healthcare insurance payor, Medicare Part D provider, etc.), such as the purchase processor computer 108, as a destination for the electronic product request 212. In addition, the electronic product request 212 may also include information relating to the purchaser, purchase plan, prescriber, merchant, and/or the requested product or service. As an example, the electronic product request 212 may include fields of data that include one or more of the following information:

Purchase plan identifier-Payor ID/Routing Information
BIN Number; BIN Number and PCN; BIN Number and Group ID; BIN Number, PCN and Group ID; BIN Number, PCN, Group ID, and Cardholder ID (of purchaser); BIN Number, PCN, Group ID, Cardholder ID (of purchaser), Relationship Code (of purchaser), and Person Code (of purchaser); and/or BIN Number, PCN, Group ID, Cardholder ID (of purchaser), Relationship Code (of purchaser), Person Code (of purchaser), Purchaser Date of Birth, and Purchaser Gender, that designates a destination (e.g., the purchase processor computer 108) of the electronic product request 212
Purchaser Information
Name (e.g. Purchaser Last Name, Purchaser First Name, etc.)
Date of Birth of Purchaser
Gender of Purchaser
Purchaser Address (e.g. Street Address, Zip Code, etc.)
Purchaser Contact Information (e.g. purchaser telephone number, email address, etc.)
Purchaser ID or other identifier (e.g., driver's license number, social security number, Health Insurance Claim Number (HICN), etc.)
Purchase Plan Information
Cardholder Name (e.g. Cardholder First Name, Cardholder Last Name)
Cardholder ID and/or other identifier (e.g. person code)
Group ID and/or Group Information
Transaction Type
Transaction Type Code (e.g., product request (e.g., billing transaction), reversal transaction, e-script transaction, benefits determination request)
Prescriber of the Product Information
Prescriber ID or other identifier (e.g. prescriber code, NPI, DEA number)
Prescriber Name (e.g. Last Name, First Name)
Prescriber Contact Information (e.g. Telephone Number)
Prescriber Office (e.g., office name, office address)
Merchant Information
Merchant Information (e.g. store name, store address, chain identifier, etc.)
Merchant ID (e.g. merchant code, NPI, DEA number)
Product Information
Product information—Product or service identifier (e.g. product code, UPC code, NDC code, etc.), product or service name, etc.
Purchase Reference Number
Quantity of Product to be Dispensed
Days' Supply of the Product Purchased
Pricing information for the product or service (e.g. ingredient cost (e.g., in an Ingredient Cost field), dispensing fee (e.g., in a Dispensing Fee field), gross amount due (e.g., in a Gross Amount Due field), and Usual and Customary Charge amount (e.g., in a Usual and Customary Charge field))
Number of Refills Authorized
Fill Number (i.e., the current refill number for the current request 204)
Transaction Submission Date of the Electronic Product Request (the original date that the Electronic Product Request was electronically submitted to the evaluation computer 106.

The electronic product request 212 can be used to determine if the purchase plan associated with the purchase processor computer 108 approves or rejects payment coverage for the product or service being requested in the electronic product request 212 and, if approved, the amount the purchase plan will cover (or pay) for the product or service being requested and how much the purchaser pay amount (the amount the purchaser is responsible to pay for) will be.

The merchant computer 104 electronically transmits the electronic product request 212 to the evaluation computer 106 in block 406. In block 408, the evaluation computer 106 electronically receives the electronic product request 212. For example, the electronic product request 212 can be electronically transmitted by the merchant computer 104 to the evaluation computer 106 through the network 110. In block 410, the evaluation module 156 or another portion of the evaluation computer 106 can parse the electronic product request 212 to determine a transaction type for the electronic product request 212 in one of the fields of the request 212. In one example, the transaction type can be a code that identifies the request 212 as a billing transaction request. At block 412, the evaluation module 156 or another portion of the evaluation computer 106 can compare the transaction type to a table or schedule of transaction types in, for example, the database 182 to identify a matching transaction type and, based on the match select a set of business rules used to examine or audit the electronic product request 212.

At block 414, the evaluation module 156 or another portion of the evaluation computer 106 can parse the electronic product request 212 to locate and identify the field and data within the field representing the merchant identifier code that identifies the seller of the product in the request 212. At block 416, the evaluation module 156 or another portion of the evaluation computer 106 can compare the merchant identifier code to a table or schedule of merchant codes in, for example, the database 182 for merchants that have signed up for or are otherwise authorized to receive the transaction audit service to determine if the merchant identifier code from the request 212 matches at least one of the merchant codes. At block 418, an inquiry is conducted to determine if the merchant identifier code from the request 212 matches one of the merchant codes. In one example, the determination can be made by the evaluation module 156 or another portion of the evaluation computer 106. If the merchant identifier code does not match a merchant code for merchants receiving the transaction audit service, the NO branch can be followed to block 424. If the merchant identifier code does match a merchant code, then the YES branch can be followed to block 420.

In block 420, the evaluation module 156 or another portion of the evaluation computer 106 can parse the electronic product request 212 to locate and identify the field and data within the field representing the transaction submission date for the electronic product request 212. In block 422, an inquiry is conducted to determine if the transaction submission date is equal to today's date. In one example, the determination can be made by the evaluation module 156 or another portion of the evaluation computer 106. If the transaction submission date is not equal to today's date, then the NO branch can be followed to block 424, where the evaluation module 156 or another portion of the evaluation computer 106 can route the electronic product request 212 out of the transaction audit service and the request 212 can be processed outside of the described methodology. If the transaction submission date is equal to today's date, then the YES branch can be followed to block 426.

In block 426, the evaluation module 156 or another portion of the evaluation computer 106 can parse the electronic product request 212 to locate and identify the field and data within the field representing the state that the merchant business is located. In one example, this data can be included in the merchant address or other merchant identifier information within the request 212. In addition, the evaluation module 156 or another portion of the evaluation computer 106 can parse the electronic product request 212 to locate and identify the field and data within the field representing the product code for the product requested and the zip code of the residence of the purchaser.

In block 428, an inquiry is conducted to determine if the state that the merchant business is located matches one of the states that requires reporting of product sales for the product identified by the product code in the request 212. In one example, the determination can be made by the evaluation module 156 or another portion of the evaluation computer 106. For example, the evaluation module 156 can identify the states that require reporting by searching based on the product code from the request 212 in, for example, the database 182 and can then compare the state of the merchant business to the table or schedule of one or more states that require reporting for that particular product to determine if a match exists. If the state of the merchant business matches a state that requires purchase reporting for the product identified in the request 212, then the YES branch can be followed to block 438. If the state of the merchant business does not match a state that requires purchase reporting for the product identified in the request 212, then the NO branch can be followed to block 432.

In block 432, an inquiry is conducted to determine if the zip code of the purchaser of the product in the request 212 matches one of the zip codes that requires reporting of product sales for the product identified by the product code in the request 212. In one example, the determination can be made by the evaluation module 156 or another portion of the evaluation computer 106. For example, the evaluation module 156 can identify the zip codes that require reporting by searching based on the product code from the request 212 in, for example, the database 182 and can then compare the zip code of the purchaser to the table or schedule of one or more zip codes that require reporting for that particular product to determine if a match exists. If the zip code of the purchaser matches a zip code that requires purchase reporting for the product identified in the request 212, then the YES branch can be followed to block 438. If the zip code of the purchaser does not match a zip code that requires purchase reporting for the product identified in the request 212, then the NO branch can be followed to block 434.

At block 434, excess data can be removed from the electronic product request 212. In one example, the excess data can include, but is not limited to, data that is not needed for the purchase process computer 108 to make an adjudication with regard to the request 212. For example, the excess data can include the purchaser's driver's license number. In one example, the removal of excess data may be completed by the evaluation module 156 or another portion of the evaluation computer 106 and creates a modified electronic product request 212. At block 436, the evaluation module 156 or another portion of the evaluation computer 106 can electronically transmit the modified electronic product request 212 to the purchase processor computer 108. In one example, the modified electronic product request 212 can be electronically transmitted to the purchase processor computer 108 via the network 110. The process can then proceed to block 424, where the particular request is routed out of the audit transaction service.

In block 438, excess data can be removed from the electronic product request 212 to create a modified electronic product request 212. In one example, the excess data can include, but is not limited to, data that is not needed for the purchase process computer 108 to make an adjudication with regard to the request 212. For example, the excess data can include the purchaser's driver's license number. In one example, the removal of excess data may be completed by the evaluation module 156 or another portion of the evaluation computer 106. In block 440, the evaluation module 156 or another portion of the evaluation computer 106 can parse the modified electronic product request 212 to determine if the minimum necessary data elements for the audit service are in the request 212. In one example, the minimum necessary data elements can include purchaser first name, purchaser last name, purchaser date of birth, purchaser gender, purchaser zip code, product identifier, quantity of product being purchased, and transaction submission date. In one example, the evaluation module 156 can compare the list of minimum necessary elements to the request 212 and determine if the fields of each of those elements in the request 204 includes proper data (e.g., in the correct format) and sufficient data for each of the elements. At block 442, an inquiry is conducted to determine if the modified electronic product request 212 includes the necessary data elements for the transaction audit service. In one example, the determination can be made by the evaluation module 156 or another portion of the evaluation computer 106. If the modified electronic product request 212 includes the minimum necessary elements, the YES branch can be followed to block 450. If the modified electronic product request 212 does not include the minimum necessary elements, the NO branch can be followed to block 444.

In block 444, the evaluation module 156 or another portion of the evaluation computer 106 can generate a purchase request rejection 214. This purchase request rejection 214 can be generated without sending the electronic product request 212 to the purchase processor computer 108 for purchase adjudication. In block 446, the evaluation module 156 or another portion of the evaluation computer 106 can insert a rejection message into the purchase request rejection 214. In one example, the rejection message can be retrieved from the database 182 and can provide a detailed explanation as to why the electronic product request 212 was rejected by the evaluation computer 106. In block 448, the evaluation module 156 or another portion of the evaluation computer 106 can electronically transmit the purchase request rejection 214 to the merchant computer 104. In one example, the purchase request rejection 214 can be electronically transmitted to the merchant computer 104 via the network 110. The process can then continue to the END block.

In block 450, the evaluation module 156 or another portion of the evaluation computer 106 can parse the electronic product request 212 to locate and identify the field and data within the field representing the merchant identifier for the merchant submitting the electronic product request 212. In block 452, the evaluation module 156 or another portion of the evaluation computer 106 can compare the merchant identifier to a table, schedule, or list, of merchant identifiers and associated audit parameters for each of the merchant identifiers to determine if a match exists. Based on a match, the evaluation module 156 or another portion of the evaluation computer 106 can identify the elements of a first set of audit parameters and the product match audit parameters for the merchant identified in the request 212. In one example, the first set of audit parameters can be purchaser match audit parameters. The purchaser match audit parameters can define what parameters are used to match the purchaser identified in the request 212 with historical records, such as historical purchase records for the purchaser in, for example, the database 182. For example, the purchaser match audit parameters can use one or more of the purchaser first name, purchaser last name, purchaser date of birth, purchaser gender, purchaser zip code of residence, and/or purchaser ID (e.g., social security number, driver's license number, etc.). The product match audit parameters can define what parameters are used to identify products associated with the product requested in the electronic product request 212. For example, the product identifier in the request 212 can be used by the evaluation module 156 to identify related products that provide similar benefits to the product being requested or products in the same class as the product being requested. For example, when medication is the product being requested, associated products may include medications in the same therapeutic class, drug-drug interactions, morphine equivalencies, toxicity levels for combined medications, parameters for refilling a medication too soon, etc.

In block 454, the evaluation module 156 or another portion of the evaluation computer 106 can parse the modified electronic product request 212 and evaluate the data in the fields of the request 212 to determine if the request 212 includes all of the elements of the purchaser match audit parameters. For example, if the purchaser match audit parameters for the particular merchant identified in the request 212 are purchaser first name, purchaser last name, purchaser date of birth, purchaser gender, purchaser zip code of residence and the request includes data for purchaser first name, purchaser last name, purchaser gender, purchaser zip code of residence but not purchaser date of birth, the request 212 would not include all of the elements of the purchaser match audit parameters. In block 456, an inquiry is conducted to determine if the modified electronic product request 212 includes all of the elements of the purchaser match audit parameters. In one example, the determination can be made by the evaluation module 156 or another portion of the evaluation computer 106. If the request 212 does not include all of the elements of the purchaser match audit parameters, the NO branch can be followed to block 444, where a purchase request rejection 216 is generated, a message is inserted into the purchase request rejection identifying that the request 212 was rejected because it did not include all of the elements of the purchaser match audit parameters, and the rejection 216 is electronically transmitted to the merchant computer 104. In one example, the purchaser match audit parameters include: purchaser first name, purchaser last name, purchaser date of birth, purchaser gender, and purchaser zip code. In another example embodiment, the purchaser match audit parameters include: purchaser first name, purchaser last name, purchaser date of birth, purchaser gender, purchaser zip code, and purchaser ID (e.g., driver's license number). If the request 212 does include all of the elements of the purchaser match audit parameters, then the YES branch is followed to block 458.

In block 458, the evaluation module 156 or another portion of the evaluation computer 106 can parse the modified electronic product request 212 and identify the elements of the purchaser match audit parameters for the merchant identified in the request 212. In block 460, the evaluation module 156 or another portion of the evaluation computer 106 can conduct an audit of the purchased products table (e.g., the purchase transaction history) in, for example, the database 182 by comparing the elements of the purchaser match audit parameters in the request 212 to patient identifier elements in the table entries of the purchased products table to determine if one or more matches exist. A match would signify that the purchaser identified in the request 212 has previously made purchases of products that have been stored in the purchased products table. In block 462, an inquiry is conducted to determine if the elements of the purchaser match audit parameters in the request 212 matched patient identifier elements in one or more table entries of the purchased products table. In one example, the determination can be made by the evaluation module 156 or another portion of the evaluation computer 106. If no match was identified, the NO branch can be followed to block 360 of FIG. 3B, where a copy of the modified electronic product purchase transaction 212, or the data therein, can be stored in the purchased products table in the database 182. If one or more matches of the patient identifying information were identified in the purchased products table, the YES branch can be followed to block 464.

In block 464, the evaluation module 156 or another portion of the evaluation computer 106 can parse the electronic product request 204 to locate and identify the field and data within the field representing the product identifier (e.g., product name, product code (e.g. UPC code, national drug code, etc.) for the product being requested in the modified electronic product request 212. In block 466, the evaluation module 156 or another portion of the evaluation computer 106 can determine additional products other than the product identified by the product identifier in the request 212 to search for in the matching records for the purchaser. In one example, the additional products to search for can be determined based on the product identifier in the request 212 and the product match audit parameters identified in block 452. In certain example embodiments, the additional products may be products associated with the product requested in the electronic product request 212. For example, related products that provide similar benefits to the product being requested or products in the same class as the product being requested. In addition, when the medication is the product being requested, associated products may include medications in the same therapeutic class, drug-drug interactions, morphine equivalencies, toxicity levels for combined medications, parameters for refilling a medication too soon, etc.

In block 468, the evaluation module 156 or another portion of the evaluation computer 106 can compare the product identifier and the identifiers for the determined additional products to product identifiers in the matching table entries from the purchased product table for the purchaser to determine if any of the previously matching entries for the purchaser also include a match to the product identifier from the request 212 and the product identifiers for the determined additional products. In block 470, an inquiry is conducted to determine if any of the previously matching entries for the purchaser from the purchased products table also include a match to one or more of the product identifier in the request 212 and/or the determined additional product identifiers. In one example, the determination can be made by the evaluation module 156 or another portion of the evaluation computer 106. If no match is identified, the NO branch can be followed to block 360 of FIG. 3B, where a copy of the modified electronic product request 212, or the data therein, can be stored in the purchased products table in the database 182. If one or more matches are identified, the YES branch can be followed to block 472.

In block 472, the evaluation module 156 or another portion of the evaluation computer 106 can parse the matching table entry or entries to identify the prior product dispense date (the date the product was given to the purchaser) and the days' supply of the product (the number of days that the product was intended to last for the purchaser). In block 474, the evaluation module 156 or another portion of the evaluation computer 106 can identify or otherwise calculate the repurchase date for each of the matching table entries of prior product purchases by the purchaser identified in the request 212 based on the dispensed date and the days' supply in each of the matching records. For example, a dispense date of March $1^{st}$ and a days' supply of 14 days of product can have a repurchase date of March $15^{th}$ because that would be the point at which the purchaser would exhaust the use of the particular product if used in the recommended daily amount.

In block 476, the evaluation module 156 or another portion of the evaluation computer 106 can determine the second audit parameter for the merchant based on the merchant identifier in the request 212. In one example, the second audit parameter is a repurchase audit parameter. For example, the evaluation module 156 can compare the merchant identifier in the request 212 to a table, schedule, or list of merchant identifiers and associated audit parameters for each merchant identifier in, for example, the database 182 to identify a record having a matching merchant identifier. The evaluation module can then identify the second audit parameter in the matching record. In certain example embodiments, the second audit parameter can be a predetermined threshold number of days or a predetermined threshold percentage of utilized product. For example, if the second audit parameter is 3 days for the particular merchant identified in the request 212, a repurchase request, such as request 212, by the purchaser on March $12^{th}$ would not violate the threshold, but a repurchase request submitted on March $11^{th}$ would violate the threshold as being too soon for repurchase. In another example, if the second audit parameter is 80 percent of the product dispensed and the days' supply was 14 days, a repurchase request, such as request 212, by the purchaser on March $12^{th}$ would not violate the threshold (80% of 14 days is 11.2 days which can be rounded down to 11 days from March 1st) but a repurchase request submitted on March $11^{th}$ would violate the threshold as being too soon for repurchase. In certain example embodiments, the second audit parameter for the merchant can be the same or different for different products and can be different for the same product dispensed at different amounts or different days' supply. Further, the predetermined threshold number of days can be anywhere in the range of 1-10 and the predetermined threshold percentage of utilized product can be anywhere in the range of 20%-100% of the product utilized.

In block 478, the evaluation module 156 or another portion of the evaluation computer 106 can compare the calculated repurchase date for the products in each of the matching entries to the one or more second audit parameters for the merchant and optionally the product in the matching entry to determine if the second audit parameter is violated. In block 480, an inquiry is conducted to determine if the one or more second audit parameters is violated. In one example, the determination can be made by the evaluation module 156 or another portion of the evaluation computer 106. If the second audit parameter is not violated, the NO branch can be followed to block 360 of FIG. 3B, where a copy of the modified electronic product request 212, or the data therein, can be stored in the purchased products table in the database 182. If one or more of the second audit parameters is violated, the YES branch can be followed to block 482.

In block 482, the evaluation module 156 or another portion of the evaluation computer 106 can determine the purchase plan matching audit parameters for the merchant based on the merchant identifier in the modified electronic product request 212. For example, the evaluation module 156 can compare the merchant identifier in the request 212 to a table, schedule, or list of merchant identifiers and associated audit parameters for each merchant identifier in, for example, the database 182 to identify a record having a matching merchant identifier. The evaluation module can then identify the purchase plan matching audit parameter in the matching record. In certain example embodiments, the purchase plan matching audit parameter can be one or more of a BIN Number, PCN, Group ID, Cardholder ID, Relationship Code (of purchaser), Person Code (of purchaser), purchaser date of birth, and/or purchaser gender. In block 484, the evaluation module 156 or another portion of the evaluation computer 106 can parse the modified electronic product request 212 and evaluate the fields and the data therein to determine if the request 212 includes data for all of elements of the purchase plan matching audit parameters.

In block 486, an inquiry is conducted to determine if the modified electronic product request 212 includes data for all of the elements of the purchase plan matching audit parameters. In one example, the inquiry can be conducted by the evaluation module 156 or another portion of the evaluation computer 106. If the request 212 does not include all of the elements of the purchase plan matching audit parameters, the NO branch can be followed to block 444 of FIG. 4B, where a purchase request rejection 218 is generated, a message is inserted into the purchase request rejection 218 identifying that the request 212 was rejected because it did not include all of the elements of the purchase plan matching audit parameters, and the rejection 218 is electronically transmitted to the merchant computer 104. If the request 212 does include all of the elements of the purchase plan matching audit parameters, the YES branch can be followed to block 488.

In block 488, the evaluation module 156 or another portion of the evaluation computer 106 can parse the modified electronic product request 212 to identify the prescriber of the product requested in the request 212. In one example, the prescriber can be identified by a prescriber identifier (e.g., prescriber name, prescriber ID (e.g., national provider identifier code, drug enforcement administration number), etc.).

In block 490, the evaluation module 156 or another portion of the evaluation computer 106 can identify the alert message notification parameters for the merchant based on the merchant identifier in the request 212. For example, the evaluation module 156 can compare the merchant identifier in the request 212 to a table, schedule, or list of merchant identifiers and associated audit parameters for each merchant identifier in, for example, the database 182 to identify a record having a matching merchant identifier. The evaluation module 156 can then identify the alert message notification audit parameters in the matching record. In one example, the alert message notification parameter is used to determine if an alert should be sent to the merchant of the product in the request 212. The alert message notification parameters can identify one or more parameters to compare between the modified electronic product request 212 and the prior purchase request of the purchaser in the purchased products table for which a second audit parameter is violated. In certain example embodiments, the alert message notification parameters can include, but are not limited to, prescriber identifier, prescriber office, merchant identifier, and/or purchase plan identifier. For example, the evaluation module 156 or another portion of the evaluation computer 106 can evaluate the request 212 and the prior purchase request of the purchaser in the purchased products table for which a second audit parameter is violated to determine if the prescriber identifier (e.g., prescriber ID) in each matches the other, if the merchant identifier (e.g., merchant ID) in each matches the other, if the purchase plan identifier (e.g., BIN Number; BIN Number and PCN; BIN Number and Group ID; BIN Number, PCN and Group ID; BIN Number, PCN, Group ID, and Cardholder ID (of purchaser); BIN Number, PCN, Group ID, Cardholder ID (of purchaser), Relationship Code (of purchaser), and Person Code (of purchaser); and/or BIN Number, PCN, Group ID, Cardholder ID (of purchaser), Relationship Code (of purchaser), Person Code (of purchaser), Purchaser Date of Birth, and Purchaser Gender) in each matches the other, and/or if the prescriber office in each matches the other. The combination of matches and non-matches of the alert message notification parameters can determine if the alert message notification is generated and sent to the merchant computer 104. Example of combinations include, but are not limited to the following:

prescriber ID match/merchant ID match/purchase plan ID match;

prescriber ID match/merchant ID match/purchase plan ID non-match;

prescriber ID match/merchant ID non-match/purchase plan ID non-match;

prescriber ID match/merchant ID non-match/purchase plan ID match;

prescriber ID non-match/merchant ID non-match/purchase plan ID non-match;

prescriber ID non-match/merchant ID match/purchase plan ID match;

prescriber ID non-match/merchant ID match/purchase plan ID non-match;

prescriber ID non-match/merchant ID non-match/purchase plan ID match.

In block 492, the evaluation module 156 or another portion of the evaluation computer 106 can parse the modified electronic product request 212 and each prior purchase request of the purchaser in the purchased products table for which a second audit parameter is violated to identify the data elements of the alert notification parameters in each of the request 212 and each prior purchase request that violates a second audit parameter. For example, the evaluation module 156 can parse the modified electronic product request 212 and identify the prescriber ID, merchant ID, and purchase plan ID data in the fields of the request 212 and can also parse each table entry of each prior purchase request of the purchaser that violates the second audit parameter to identify the prescriber ID, merchant ID, and purchase plan ID data in the fields of each prior purchase request of the purchaser.

In block 494, the evaluation module 156 or another portion of the evaluation computer 106 can compare each associated data element from the modified electronic product request and the prior purchase request of the purchaser that violates the second audit parameter to determine if they do or do not match. Further, based on the combinations of matches and non-matches for each of the elements of the alert notification parameters, the evaluation module 156 can determine, as discussed with reference to block 490, if an alert is to be generated and transmitted to the merchant at the merchant computer 104.

In block 496, an inquiry is conducted to determine if the alert notification message is to be generated and transmitted to the merchant computer 104. In one example, the determination can be made by the evaluation module 156 or another portion of the evaluation computer 106. For example, based on the combination of matches and non-matches of the elements of the alert notification parameters, as described with reference to block 490, the evaluation module 156 can determine if the alert notification message will be generated and transmitted to the merchant computer 104. If, based on the combination of matches and non-matches of the elements of the alert notification parameters, an alert notification message will not be generated and transmitted to the merchant computer 104, the NO branch can be followed to block 360 of FIG. 3B, where a copy of the modified electronic product request 212, or the data therein, can be stored in the purchased products table in the database 182. If, based on the combination of matches and non-matches of the elements of the alert notification parameters, it is determined that an alert notification message will be generated and transmitted to the merchant computer 104, the YES branch can be followed to block 498.

In block 498, an inquiry can be conducted to determine if an alert notification message was previously transmitted to the merchant computer 104 for this modified electronic product request 212. For example, when an alert notification message is sent to the merchant computer 104 for a request 212, an indication of the transmission of the alert notification message can be stored in the database 182 along with information from the request 212. In certain example embodiments, the information from the request 212 can include, but is not limited to, the merchant ID, purchaser ID, product ID, transmission date, and/or purchase reference number (e.g., prescription/service reference number or another numeric or alphanumeric code that serves to designate this request as being different from all other electronic product requests received by the evaluation computer 106). In one example, the evaluation module 156 or another portion of the evaluation computer 106 can compare the current purchase reference number for the request 212 to a table of purchase reference numbers for requests for which an alert notification message has been transmitted to determine if a match exists. If a match exists that would represent that the alert notification message has been previously transmitted for the modified electronic product request 212. Optionally, the matching record can be parsed to determine the transmission date of the alert notification message. In certain example embodiments, the determination can be limited to alert notification messages sent in the same calendar day based on a comparison to the transmission date in the matching record. If an alert notification message has not been previously transmitted for the request 212 or has not been transmitted in the current calendar day, the NO branch can be followed to block 504. If an alert notification message has previously been transmitted for the request 212 and optionally has been transmitted during the current calendar day, the YES branch can be followed to block 500.

In block 500, an inquiry is conducted to determine if the modified electronic product request 212 includes an override code to override the alert notification message. In one example, the determination can be made by the evaluation module 156 or another portion of the evaluation computer 106. For example, the evaluation module 156 can parse the modified electronic product request 212 to locate and identify the field associated with the override code and determine if the field includes data representing a proper override code. If it is determined that the modified electronic product request 212 includes a proper override code, the YES branch can be followed to block 360 of FIG. 3B, where a copy of the modified electronic product request 212, or the data therein, can be stored in the purchased products table in the database 182. On the other hand, if it is determined that the modified electronic product request 212 does not include an override code, then the NO branch can be followed to block 502.

In block 502, an inquiry is conducted to determine if the alert notification is to be suppressed or prevented. In one example, the determination can be made by the evaluation module 156 or another portion of the evaluation computer 106. For example, certain merchants may not wish to receive alert notification messages. The database can include a table of merchants that do not wish to receive the alert notification message which can be searchable by the merchant ID. The evaluation module 156 can compare the merchant ID from the request 212 to the table of merchant IDs for merchants that want the alert notification message suppressed. A match would represent that that merchant identified in the request 212 does not want to receive the alert notification message. If the alert notification message is to be prevented, the YES branch can be followed to block 360 of FIG. 3B, where a copy of the modified electronic product request 212, or the data therein, can be stored in the purchased products table in the database 182. In certain example embodiments, the electronic product request 212 and modified electronic product request 212 can be any one of a healthcare claim transaction, prescription claim request, prescription billing request, healthcare order transaction, or e-prescription request (e.g., electronic prescription order transaction, e-script, or e-prescription). If the alert notification message is not to be prevented, the NO branch is followed to block 504.

In block 504, the evaluation module 156 or another portion of the evaluation computer 106 can generate a purchase request rejection 220. In one example, the purchase request rejection 220 can include all or a portion of the data elements in the modified electronic product request 212. In block 506, the evaluation module 156 or another portion of the evaluation computer 106 can identify the alert notification message format for the alert notification message to be inserted into the purchase request rejection 220. In one example, the evaluation module 156 can compare the merchant ID from the request 212 to a table of alert message notification formats to determine which table entry of the formats that includes a matching merchant ID. At block 508, the evaluation module 156 or another portion of the evaluation computer 106 can insert the alert notification message based on the identified format into the purchase request rejection 220. In block 510, the evaluation module 156 or another portion of the evaluation computer 106 can electronically transmit the purchase request rejection 220 and included alert notification message to the merchant computer 104 via, for example, the network 110. The process can then continue to the END block.

The methodology for the evaluation system described and shown in FIGS. 3A-4C may be carried out or performed in any suitable order as desired in various embodiments. Additionally, in certain example embodiments, at least a portion of the operations may be carried out in parallel. Furthermore, in certain example embodiments, less than or more than the operations described in FIGS. 3A-4C may be performed.

Figure 2B:
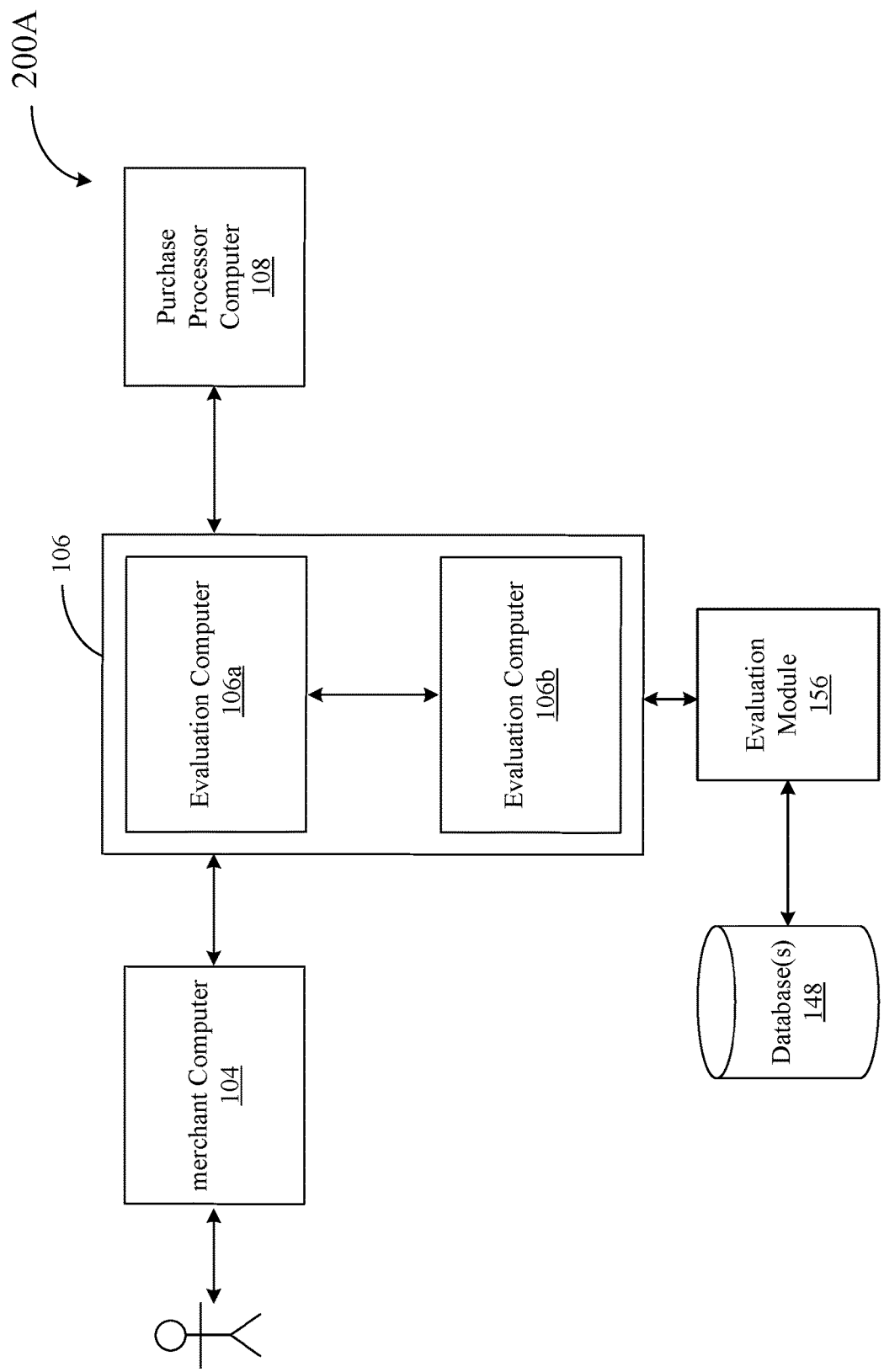
FIG. 2B is a diagram of another example system flow for auditing purchase transactions according to an alternative example embodiment of the disclosure.

Likewise, while FIGS. 3A-4C have been described primarily in conjunction with FIG. 2A, it will be appreciated that variations of FIG. 2A are available. As shown by the system 200A of FIG. 2B, the evaluation computer 106 may include two or more distinct evaluation computers 106a and 106b that are in communication with each other. These distinct evaluation computers 106a and 106b may be owned, operated, and or located by the same or distinct and wholly-unrelated companies. The evaluation computer 106a may be operative with the merchant computer 104, while the evaluation computer 106b may be operative with other merchant computers. However, the evaluation computer 106b may have an evaluation arrangement with the evaluation computer 106a. Under the evaluation arrangement, the evaluation computer 106a may be permitted to utilize or offer services of the evaluation computer 106b, including the operations and use of the evaluation module 156 and the data in the database 182 to provide purchase evaluation services as discussed above. Accordingly, the services accessible by the evaluation computer 106b, including the copies of requests or other data in the database 182, may be available to the merchant computer 104 via the evaluation computers 106a and 106b.

Although example embodiments of the disclosure have been described, one of ordinary skill in the art will recognize that numerous other modifications and alternative embodiments are within the scope of the disclosure. Furthermore, while various example implementations and architectures have been described in accordance with example embodiments of the disclosure, one of ordinary skill in the art will appreciate that numerous other modifications to the example implementations and architectures described herein are also within the scope of this disclosure.

Furthermore, the example embodiments disclosed above have been discussed with reference to certain specific fields of electronic product requests and adjudicated electronic product requests. The use of specific field names above and in the claims is not intended to be limiting. Other fields or fields with other names in requests/transactions or responses or other data in a request/transaction or responses that are different but that have essentially the same functional basis or representation are within the scope of each particular field name used herein and in the claims.

Certain aspects of the disclosure are described above with reference to block and flow diagrams of systems, methods, apparatuses, and/or computer program products according to example embodiments. It will be understood that one or more blocks of the block diagrams and steps of the flow diagrams, and combinations of blocks in the block diagrams and steps of the flow diagrams, respectively, may be implemented by execution of computer-executable program instructions. Likewise, some blocks of the block diagrams and steps of the flow diagrams may not necessarily need to be performed in the order presented, or may not necessarily need to be performed at all, according to some embodiments. Further, additional components and/or operations beyond those depicted in blocks of the block and/or steps of the flow diagrams may be present in certain embodiments.

Accordingly, blocks of the block diagrams and steps of the flow diagrams support combinations of means for performing the specified functions, combinations of elements or steps for performing the specified functions and program instruction means for performing the specified functions. It will also be understood that each block of the block diagrams and step of the flow diagrams, and combinations of blocks in the block diagrams and steps of the flow diagrams, may be implemented by special-purpose, hardware-based computer systems that perform the specified functions, elements or steps, or combinations of special-purpose hardware and computer instructions.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or steps specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or steps specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although example embodiments have been described in language specific to structural features and/or methodological acts, it is to be understood that the disclosure is not necessarily limited to the specific features or acts described. Rather, the specific features and acts are disclosed as illustrative forms of implementing the example embodiments. Conditional language, such as, among others, "can," "could," "might," or "may," unless specifically stated otherwise, or otherwise understood within the context as used, is generally intended to convey that certain example embodiments could include, while other example embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A computer system for efficiently auditing purchase transactions by performing the auditing in real-time or near real-time responsive to the purchase transaction being requested, the computer system comprising:
    at least one memory operable to store computer-executable instructions; and
    at least one processor configured to access the at least one memory and execute the computer-executable instructions to:
        receive an electronic product request comprising a plurality of fields, each field configured to receive data, the request comprising a merchant identifier identifying a merchant, a product identifier identifying a product from the merchant, and a plurality of party identifier data identifying a party;
        parse the plurality of fields in the electronic product request to identify the merchant identifier in one of the plurality of fields;
        determine, based on the merchant identifier, a first set of audit parameters and a second audit parameter to examine the electronic product request;
        parse the plurality of fields in the electronic product request to identify at least a portion of the plurality of the party identifier data based on the first set of audit parameters;

compare the at least the portion of the party identifier data to a plurality of historical records to identify at least one prior record for the party;

identify a date for a first product in the at least one prior record;

compare the date to the second audit parameter to determine if the date violates the second audit parameter; and if the date violates the second audit parameter, generate an alert notification and provide the alert notification to the merchant in real-time or near real-time responsive to the electronic product request.

2. The computer system of claim 1, wherein the processor is further configured to identify the date for the first product in the at least one prior record by accessing the memory and executing the computer-executable instructions to:

parse the at least one prior record to identify a dispense date for the first product;

parse the at least one prior record to identify a days' supply for the first product;

add the days' supply for the first product to the dispense date for the first product to identify the date for the dispensed product.

3. The computer system of claim 1, wherein the processor is further configured to identify at least one prior record for the party by accessing the memory and executing the computer-executable instructions to:

determine, based on the merchant identifier, a product match audit parameter to examine the electronic product request;

parse the plurality of fields in the electronic product request to identify the product identifier; and determine, based on the product identifier and the product match audit parameter, at least one additional product identifier for an additional product different from the product.

4. The computer system of claim 3, wherein the processor is further configured to identify at least one prior record for the party by accessing the memory and executing the computer-executable instructions to:

compare the product identifier and the at least one additional product identifier to product identifier data in each of the plurality of historical records; and identify at least one prior record for the party comprising product identifier data that matches at least one of the product identifier for the product and the at least one additional product identifier for the additional product.

5. The computer system of claim 1, wherein the processor is further configured to access the memory and execute the computer-executable instructions to:

parse the plurality of fields in the electronic product request to identify at least one excess data element in the electronic product request; and remove the at least one excess data element from the electronic product request.

6. The computer system of claim 1, wherein the merchant identifier comprises a state of a merchant location for the merchant and wherein the processor is further configured to access the memory and execute the computer-executable instructions to:

parse the plurality of fields in the electronic product request to identify the state of the merchant location in at least one of the plurality of fields;

compare the state of the merchant location to a plurality of reportable states; and determine, based on the comparison of the state of the merchant location to the plurality of reportable states, that the state of the merchant location matches one of the plurality of reportable states;

wherein generating the alert notification is further based on the determination that the state of the merchant location matches one of the plurality of reportable states.

7. The computer system of claim 6, wherein the plurality of party identifier data comprises a zip code of a residence of the party and wherein the processor is further configured to access the memory and execute the computer-executable instructions to:

parse the plurality of fields in the electronic product request to identify the zip code of the party;

compare the zip code of the party to a plurality of reportable zip codes; and determine, based on the comparison of the zip code of the party to the plurality of reportable zip codes, that the zip code of the party matches one of the plurality of reportable zip codes;

wherein generating the alert notification is further based on the determination that the zip code of the party matches one of the plurality of reportable zip codes.

8. The computer system of claim 1, wherein the processor is further configured to access the memory and execute the computer-executable instructions to:

generate, based at least on the positive determination that the date violates the second audit parameter, an electronic purchase request rejection;

insert the alert notification into a field of the electronic purchase request rejection; and electronically transmit the electronic purchase request rejection to a merchant computer associated with the merchant.

9. The computer system of claim 1, wherein the processor is further configured to access the memory and execute the computer-executable instructions to:

if the date does not violate the second audit parameter, store at least a portion of data in the plurality of fields of the electronic product request in a storage medium as a historical purchase record; and electronically transmit the electronic product request to a purchase processor computer for adjudication.

10. A computer-implemented method efficiently auditing purchase transactions by performing the auditing in real-time or near real-time responsive to the purchase transaction being requested, the computer-implemented method comprising:

receiving, by an evaluation computer comprising one or more processors from a merchant computer associated with a merchant, an electronic product request comprising a plurality of fields, each field configured to receive data, the request comprising a merchant identifier identifying the merchant, a product identifier identifying a product from the merchant, and a plurality of party identifier data identifying a party;

parsing, by the evaluation computer, the plurality of fields in the electronic product request to identify the merchant identifier in one of the plurality of fields;

determining, by the evaluation computer and based on the merchant identifier, a first set of audit parameters and a second audit parameter to examine the electronic product request;

parsing, by the evaluation computer, the plurality of fields in the electronic product request to identify at least a portion of the plurality of the party identifier data based on the first set of audit parameters;

comparing, by the evaluation computer, the at least the portion of the party identifier data to a plurality of historical records to identify at least one prior record for the party;

identifying, by the evaluation computer, a date for a first product in the at least one prior record;

comparing, by the evaluation computer, the date to the second audit parameter to determine if the date violates the second audit parameter; and if the date violates the second audit parameter, generating, by the evaluation computer, an alert notification and providing the alert notification to the merchant in real-time or near real-time responsive to the electronic product request.

11. The computer-implemented method of claim 10, wherein identifying the date for the first product in the at least one prior record comprises:

parsing, by the evaluation computer, the at least one prior record to identify a dispense date for the first product;

parsing, by the evaluation computer, the at least one prior record to identify a days' supply for the first product;

adding, by the evaluation computer, the days' supply for the first product to the dispense date for the first product to identify the date for the dispensed product.

12. The computer-implemented method of claim 10, wherein identifying at least one prior record for the party further comprises:

determining, by the evaluation computer and based on the merchant identifier, a product match audit parameter to examine the electronic product request;

parsing, by the evaluation computer, the plurality of fields in the electronic product request to identify the product identifier; and determining, by the evaluation computer and based on the product identifier and the product match audit parameter, at least one additional product identifier for an additional product different from the product.

13. The computer-implemented method of claim 12, wherein identifying at least one prior record for the party further comprises:

comparing, by the evaluation computer, the product identifier and the at least one additional product identifier to product identifier data in each of the plurality of historical records; and identifying, by the evaluation computer, at least one prior record for the party comprising product identifier data that matches at least one of the product identifier for the product and the at least one additional product identifier for the additional product.

14. The computer-implemented method of claim 10, further comprising:

parsing, by the evaluation computer, the plurality of fields in the electronic product request to identify at least one excess data element in the electronic product request; and removing, by the evaluation computer, the at least one excess data element from the electronic product request.

15. The computer-implemented method of claim 10, wherein the merchant identifier comprises a state of a merchant location for the merchant and wherein the method further comprises:

parsing, by the evaluation computer, the plurality of fields in the electronic product request to identify the state of the merchant location in at least one of the plurality of fields;

comparing, by the evaluation computer, the state of the merchant location to a plurality of reportable states; and determining, by the evaluation computer and based on the comparison of the state of the merchant location to the plurality of reportable states, that the state of the merchant location matches one of the plurality of reportable states;

wherein generating the alert notification is further based on the determination that the state of the merchant location matches one of the plurality of reportable states.

16. The computer-implemented method of claim 15, wherein the plurality of party identifier data comprises a zip code of a residence of the party and wherein the method further comprises:

parsing, by the evaluation computer, the plurality of fields in the electronic product request to identify the zip code of the party;

comparing, by the evaluation computer, the zip code of the party to a plurality of reportable zip codes; and determining, by the evaluation computer and based on the comparison of the zip code of the party to the plurality of reportable zip codes, that the zip code of the party matches one of the plurality of reportable zip codes;

wherein generating the alert notification is further based on the determination that the zip code of the party matches one of the plurality of reportable zip codes.

17. The computer-implemented method of claim 10, further comprising:

generating, by the evaluation computer and based at least on the positive determination that the date violates the second audit parameter, an electronic purchase request rejection;

inserting, by the evaluation computer, the alert notification into a field of the electronic purchase request rejection; and electronically transmitting, by the evaluation computer, the electronic purchase request rejection to the merchant computer associated with the merchant.

18. The computer-implemented method of claim 10, further comprising:

if the date does not violate the second audit parameter, storing, by the evaluation computer, at least a portion of data in the plurality of fields of the electronic product request in a storage medium as a historical purchase record; and electronically transmitting, by the evaluation computer, the electronic product request to a purchase processor computer for adjudication.

19. A non-transitory computer-readable medium for efficiently auditing purchase transactions by performing the auditing in real-time or near real-time responsive to the purchase transaction being requested, the transitory computer-readable medium comprising computer-executable instructions that, when executed by one or more processors, configure the one or more processors to perform operations comprising:

receive an electronic product request comprising a plurality of fields, each field configured to receive data, the request comprising a merchant identifier identifying a merchant, a product identifier identifying a product from the merchant, and a plurality of party identifier data identifying a party;

parse the plurality of fields in the electronic product request to identify the merchant identifier in one of the plurality of fields;

determine, based on the merchant identifier, a first set of audit parameters and a second audit parameter to examine the electronic product request;

parse the plurality of fields in the electronic product request to identify at least a portion of the plurality of the party identifier data based on the first set of audit parameters;

compare the at least the portion of the party identifier data to a plurality of historical records to identify at least one prior record for the party;

identify a date for a first product in the at least one prior record;

compare the date to the second audit parameter to determine if the date violates the second audit parameter; and if the date violates the second audit parameter, generate an alert notification and provide the alert notification to the merchant in real-time or near real-time responsive to the electronic product request.

20. The non-transitory computer-readable medium of claim 19, wherein the operations further comprise:

determine, based on the merchant identifier, a product match audit parameter to examine the electronic product request;

parse the plurality of fields in the electronic product request to identify the product identifier;

determine, based on the product identifier and the product match audit parameter, at least one additional product identifier for an additional product different from the product compare the product identifier and the at least one additional product identifier to product identifier data in each of the plurality of historical records; and identify at least one prior record for the party comprising product identifier data that matches at least one of the product identifier for the product and the at least one additional product identifier for the additional product.

\* \* \* \* \*